(12) United States Patent
Shin et al.

(10) Patent No.: US 12,030,428 B1
(45) Date of Patent: Jul. 9, 2024

(54) PILLAR MODULE

(71) Applicant: HYUNDAI MOBIS CO., LTD., Seoul (KR)

(72) Inventors: Cheon Seop Shin, Yongin-Si (KR); Sang Il Chung, Yongin-si (KR); Tae Kyoung Jin, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/335,293

(22) Filed: Jun. 15, 2023

(30) Foreign Application Priority Data

Dec. 29, 2022 (KR) ........................ 10-2022-0188768

(51) Int. Cl.
| | |
|---|---|
| *B60Q 1/26* | (2006.01) |
| *B60Q 1/00* | (2006.01) |
| *B60Q 1/12* | (2006.01) |
| *B60Q 1/18* | (2006.01) |
| *B60Q 1/50* | (2006.01) |
| *B60R 11/00* | (2006.01) |
| *B60R 11/02* | (2006.01) |

(52) U.S. Cl.
CPC ......... *B60Q 1/2661* (2013.01); *B60Q 1/0076* (2013.01); *B60Q 1/12* (2013.01); *B60Q 1/18* (2013.01); *B60Q 1/503* (2013.01); *B60Q 1/0023* (2013.01); *B60Q 2300/122* (2013.01); *B60Q 2900/40* (2022.05); *B60R 2011/0022* (2013.01); *B60R 11/0217* (2013.01)

(58) Field of Classification Search
CPC .... B60Q 1/26661; B60Q 1/0076; B60Q 1/12; B60Q 1/18; B60Q 1/503; B60Q 1/0023; B60Q 2900/40
See application file for complete search history.

(56) References Cited

U.S. PATENT DOCUMENTS

| | | |
|---|---|---|
| 11,180,207 B2 | 11/2021 | Sardes et al. |
| 11,479,295 B1 | 10/2022 | Kenion |
| 2018/0345777 A1 | 12/2018 | Birnschein et al. |
| 2022/0126918 A1 | 4/2022 | Sardes et al. |

FOREIGN PATENT DOCUMENTS

| | | | | |
|---|---|---|---|---|
| DE | 102017105222 A1 | * | 10/2017 | ........... B60Q 1/0023 |
| DE | 102020131008 A1 | | 12/2021 | |
| EP | 1443533 B1 | * | 2/2007 | ........... B60Q 1/0076 |
| KR | 10-2336410 B1 | | 12/2021 | |
| WO | WO-2018021504 A1 | * | 2/2018 | ............. B60K 35/00 |
| WO | 2022/254382 A1 | | 12/2022 | |

OTHER PUBLICATIONS

Innovation q+ npl search (Year: 2023).*
Extended European Search Report issued on Aug. 25, 2023 in the corresponding European Patent Application No. 23161649.1.

* cited by examiner

*Primary Examiner* — Anabel Ton
(74) *Attorney, Agent, or Firm* — NovoTechIP International PLLC

(57) ABSTRACT

A pillar module may include: a pillar body, a drive unit connected to the pillar body and configured to support the pillar body so that the pillar body is movable, a first lighting unit installed on the pillar body and configured to create a first lighting pattern, a second lighting unit disposed to be spaced apart from the first lighting unit and configured to create a second lighting pattern, and a switching unit connected to the first lighting unit and the second lighting unit and configured to selectively expose the first lighting unit and the second lighting unit to the outside of the pillar body.

20 Claims, 27 Drawing Sheets

PILLAR MODULE

CROSS-REFERENCE TO RELATED APPLICATIONS

This application claims priority from and the benefit of Korean Patent Application No. 10-2022-0188768, filed on Dec. 29, 2022, which is hereby incorporated by reference for all purposes as if set forth herein.

TECHNICAL FIELD

Exemplary embodiments of the present disclosure relate to a pillar module, and more particularly, to a pillar module in which a power device, a lighting device, and a sensing device of a vehicle are integrated into a single device.

BACKGROUND

In general, an electric vehicle refers to a vehicle that may use electrical energy, which is stored in a battery, as a power source. The advantage of the electric vehicle is that neither soot nor smoke is produced, little noise is generated, and a vehicle body is lightweight.

Furthermore, new mobility visions with new concepts for implementing human-oriented dynamic future cities have been introduced to vehicle industries. One of the future mobility solutions is a purpose-built vehicle (PBV) as a purpose-based mobility vehicle.

However, in the case of a vehicle in the related art, a drive device, a lighting device, a sensing device, and the like are separated as separate structures and systems, which makes it difficult to apply the drive device, the lighting device, the sensing device, and the like to the PBV used for various purposes.

The background technology of the present disclosure is disclosed in Korean Patent No. 10-2336410 (registered on Dec. 2, 2021, and entitled 'Prefabricated vehicle').

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of the present disclosure is to provide a pillar module in which a power device, a lighting device, and a sensing device of a vehicle are integrated into a single device.

An object of the present disclosure is to provide a pillar module capable of being applied to various mobility vehicles on the basis of a high degree of design freedom.

In an embodiment, a pillar module may include: a pillar body; a drive unit connected to the pillar body and configured to support the pillar body so that the pillar body is movable; a first lighting unit installed on the pillar body and configured to create a first lighting pattern; a second lighting unit disposed to be spaced apart from the first lighting unit and configured to create a second lighting pattern; and a switching unit connected to the first lighting unit and the second lighting unit and configured to selectively expose the first lighting unit and the second lighting unit to the outside of the pillar body.

An accommodation portion having an opening side formed at one side thereof may be formed in the pillar body, and the first lighting unit and the second lighting unit may be disposed in the accommodation portion and selectively face the opening side while operating in conjunction with an operation of the switching unit.

The switching unit may include: a switching case rotatably installed in the accommodation portion and configured to support the first lighting unit and the second lighting unit; and a switching actuator connected to the switching case and configured to generate a rotational force to rotate the switching case.

A central axis of the switching case may be disposed in parallel with the opening side.

The first lighting unit and the second lighting unit may be disposed to be spaced apart from each other along a peripheral surface of the switching case.

The first lighting unit may include a road surface illumination lamp configured to rotate together with the switching case and configured to emit an optical image toward a road surface as the road surface illumination lamp is disposed to face the opening side.

The second lighting unit may include a plurality of pixel lamps configured to rotate together with the switching case and be independently turned on or off.

The plurality of pixel lamps may be arranged in the form of a lattice on a peripheral surface of the switching case.

The pillar module may further include: a kinetic lighting unit movably installed on the pillar body and configured to create a kinetic lighting pattern.

The kinetic lighting unit may be disposed above the first lighting unit and the second lighting unit.

The kinetic lighting unit may include a plurality of kinetic lighting members independently movably installed on the pillar body and disposed to be spaced apart from one another.

The kinetic lighting member may include: a kinetic panel including a first side rotatably connected to the pillar body, and an other side protruding outward from the pillar body or inserted within the pillar body depending on a rotation direction; a kinetic actuator connected to the first of the kinetic panel and configured to generate a rotational force to rotate the kinetic panel; and a kinetic lamp configured to be exposed to outside of the pillar body as the other side of the kinetic panel protrudes outward from the pillar body.

The kinetic lamp may be disposed at an end of the other side of the kinetic panel.

The pillar module may further include: a line lighting unit extending in an upward/downward direction along an outer surface of the pillar module.

The line lighting unit may include a plurality of line lamps disposed to be spaced apart from one another in an extension direction of the line lighting unit and configured to be independently turned on or off.

The pillar module may further include: a detection unit installed on the pillar body and configured to detect an object positioned at a periphery of the pillar body; and a control unit configured to control operations of the first lighting unit, the second lighting unit, and the switching unit.

The detection unit may be disposed at an upper side of the pillar body.

The detection unit may include a first detection member rotatably installed on the pillar body and configured to rotate in conjunction with a change in relative position between the pillar body and the object.

The pillar module may further include: a speaker unit installed on the pillar body and configured to output a sound.

The pillar module may further include: a flap movably connected to the pillar body, disposed to face the drive unit, and configured to move in conjunction with a steering operation of the drive unit.

According to the pillar module according to the present disclosure, the power device configured to move the vehicle, the lighting device configured to transmit an optical signal, and the sensing device configured to perform an interaction with a pedestrian at the periphery of the vehicle may be integrated into a single unit module, which makes it possible to fluidly apply the pillar module to mobility vehicles having various specifications and purposes.

In addition, according to the pillar module according to the present disclosure, the first lighting unit and the second lighting unit may be configured to selectively face the opening side in the accommodation portion by the switching unit, which makes it possible to improve spatial utilization and an overall aesthetic appearance of the vehicle in comparison with the case in which the first lighting unit and the second lighting unit are installed at different positions on the pillar body.

In addition, according to the pillar module according to the present disclosure, various types of lighting patterns may be created by the first lighting unit, the second lighting unit, the kinetic lighting unit, and the line lighting unit, which makes it possible to ensure safety for an object positioned outside the vehicle and more effectively transfer various types of information on the states of the vehicle.

DETAILED DESCRIPTION

Figure 1:
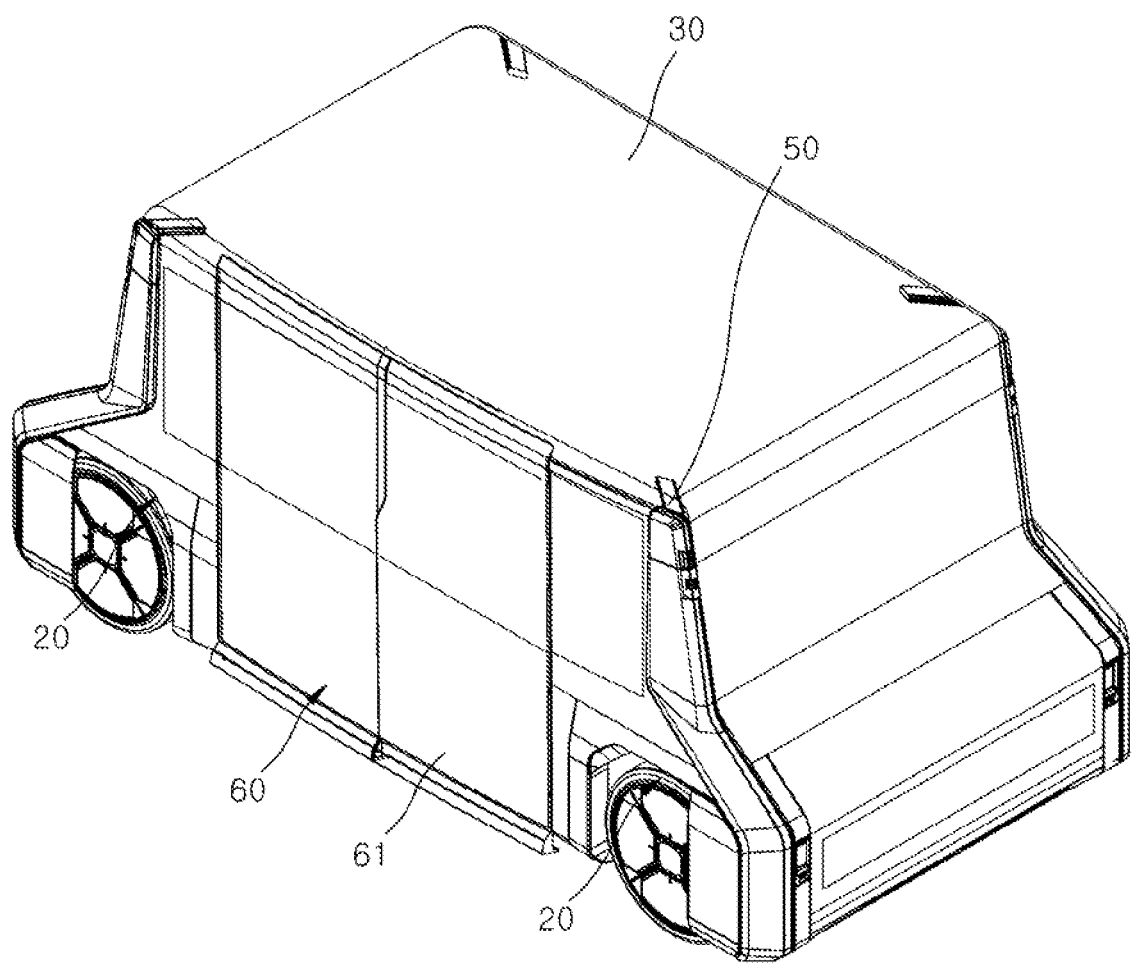
FIG. 1 is a perspective view schematically illustrating a configuration of a vehicle having a pillar module according to a first embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, a vehicle having a pillar module will be described below with reference to the accompanying drawings through various exemplary embodiments.

Figure 2:
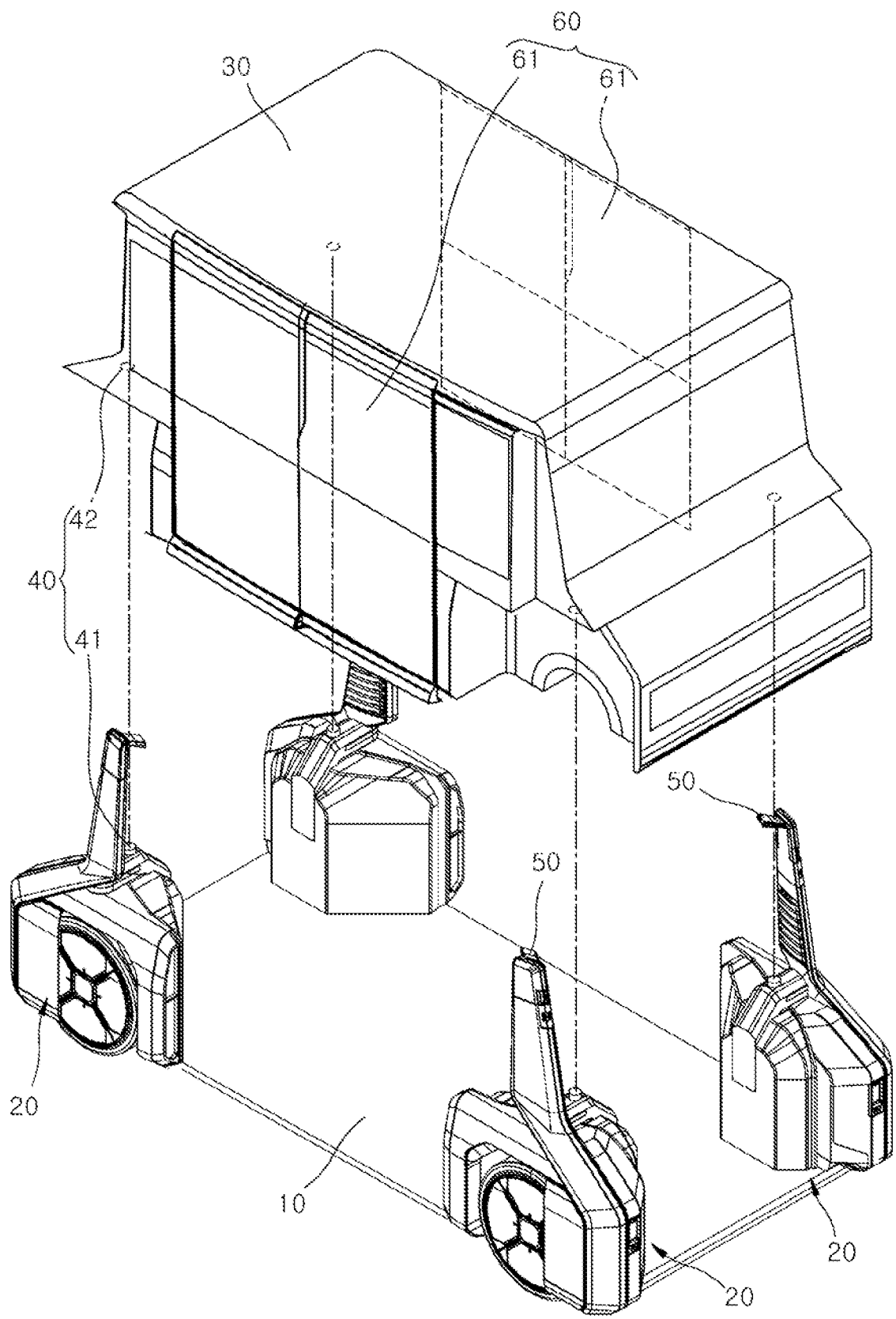
FIG. 2 is an exploded perspective view schematically illustrating a configuration of the vehicle having the pillar module according to the first embodiment of the present disclosure.

FIG. 1 is a perspective view schematically illustrating a configuration of a vehicle having a pillar module according to a first embodiment of the present disclosure, and FIG. 2 is an exploded perspective view schematically illustrating a configuration of the vehicle having the pillar module according to the first embodiment of the present disclosure.

Referring to FIGS. 1 and 2, a vehicle according to the present embodiment may include a platform 10, a pillar module 20, a main cabin 30, a docking unit 40, a stopper 50, and a door unit 60.

The platform 10 defines a lower external appearance of the vehicle according to the present embodiment and entirely supports the pillar module 20 and the main cabin 30 which will be described below. The platform 10 according to the present embodiment may be formed to have a flat plate shape. The platform 10 may be disposed to be parallel to the ground surface. The platform 10 may be supported to be spaced apart from the ground surface by means of the pillar module 20 to be described below. A battery (not illustrated) may be disposed (i.e., installed) on the platform 10 and supply power to the pillar module 20, the door unit 60, and various types of electronic devices installed in the vehicle. The battery may be seated on an upper surface of the platform 10. Alternatively, the battery may be coupled to a lower surface of the platform 10. A cross-sectional shape of the platform 10 is not limited to a quadrangular shape illustrated in FIG. 2, but may be changed in design to various shapes such as a circular shape, an elliptical shape, or a polygonal shape.

The pillar module 20 is coupled (i.e., connected) to the platform 10 and supports the platform 10. The pillar module 20 is configured such that a power device configured to move the vehicle, a lighting device configured to transmit an optical signal, and a sensing device configured to perform an interaction with a pedestrian at the periphery of the vehicle are integrated into a single unit module and simultaneously or independently perform these functions. Therefore, the pillar module 20 may be fluidly applied to the platform 10 and the main cabin 30 that have various specifications and purposes. The pillar module 20 may be provided as a plurality of pillar modules 20. The plurality of pillar modules 20 may be spaced apart from each other along a periphery of the platform 10. For example, the plurality of pillar modules 20 may be provided as four pillar modules 20 respectively disposed at edge portions of the platform 10 having a quadrangular cross-section. However, the number of pillar modules 20 and the arrangement state of the pillar modules 20 are not limited thereto, but may be variously changed in design depending on the cross-sectional shape or the like of the platform 10.

Figure 3:
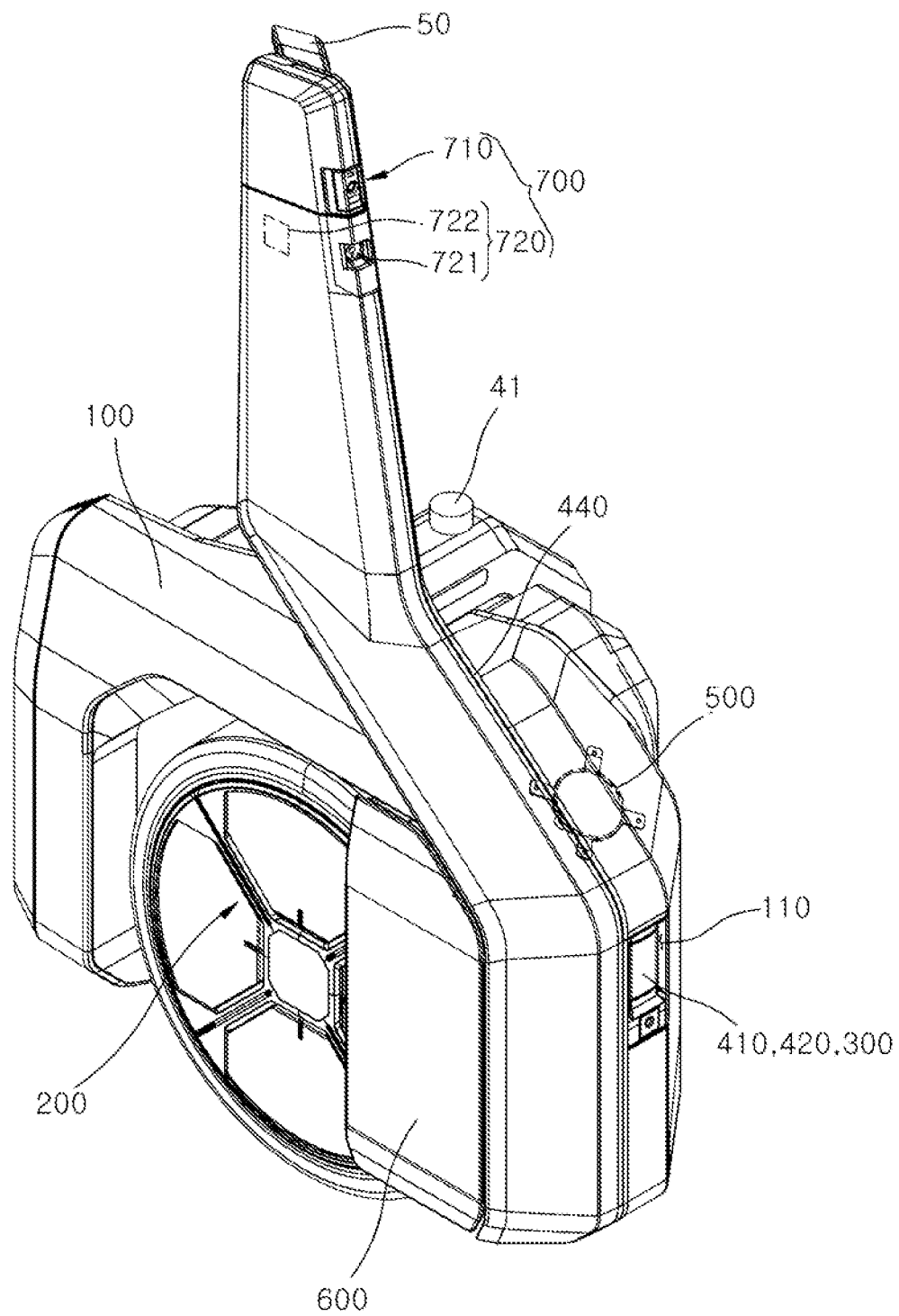
FIG. 3 is a perspective view schematically illustrating a configuration of the pillar module according to the first embodiment of the present disclosure.
Figure 4:
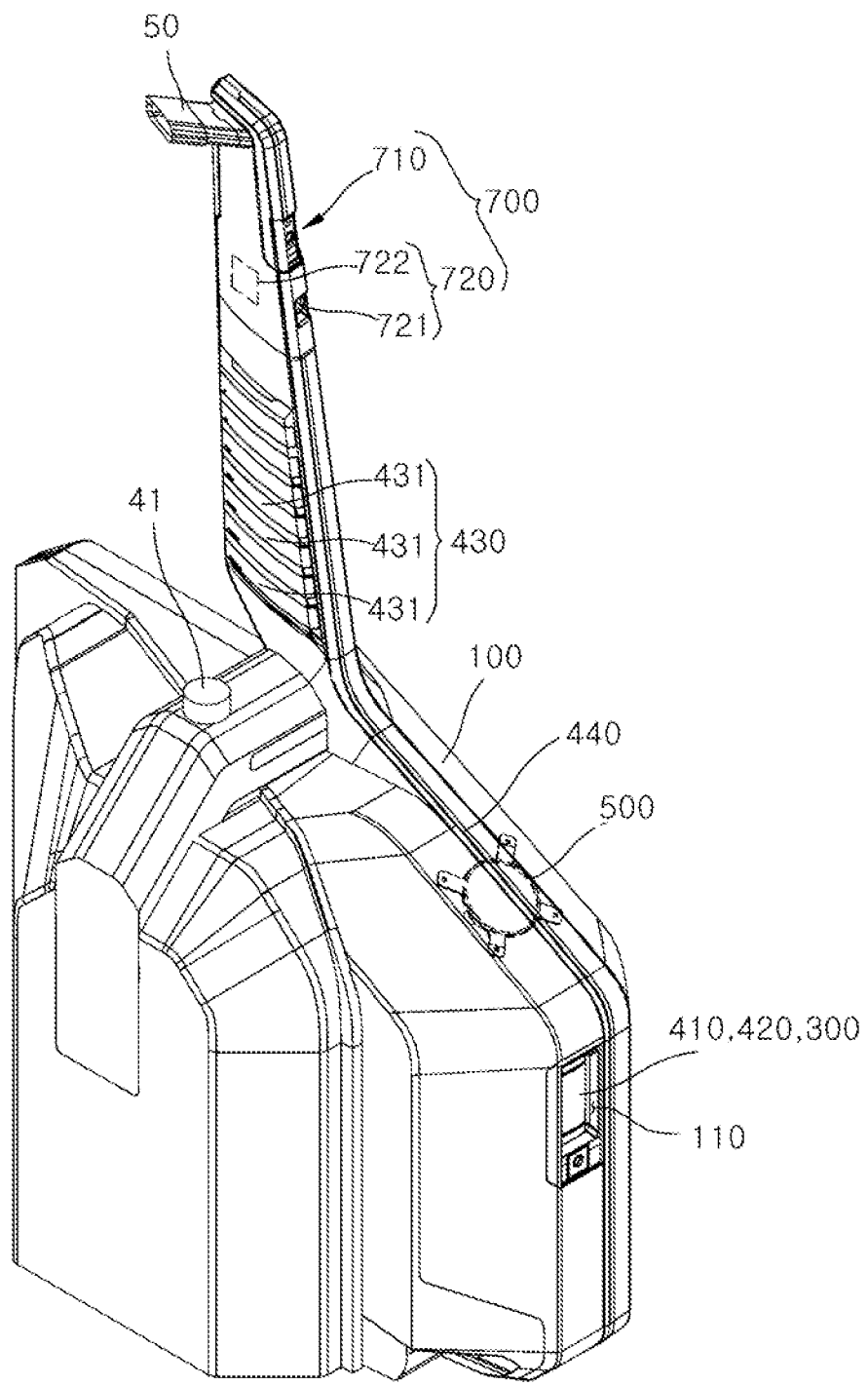
FIG. 4 is a perspective view illustrating a configuration of the pillar module according to the first embodiment of the present disclosure when viewed at a point in time different from a point in time in FIG. 3.
Figure 5:
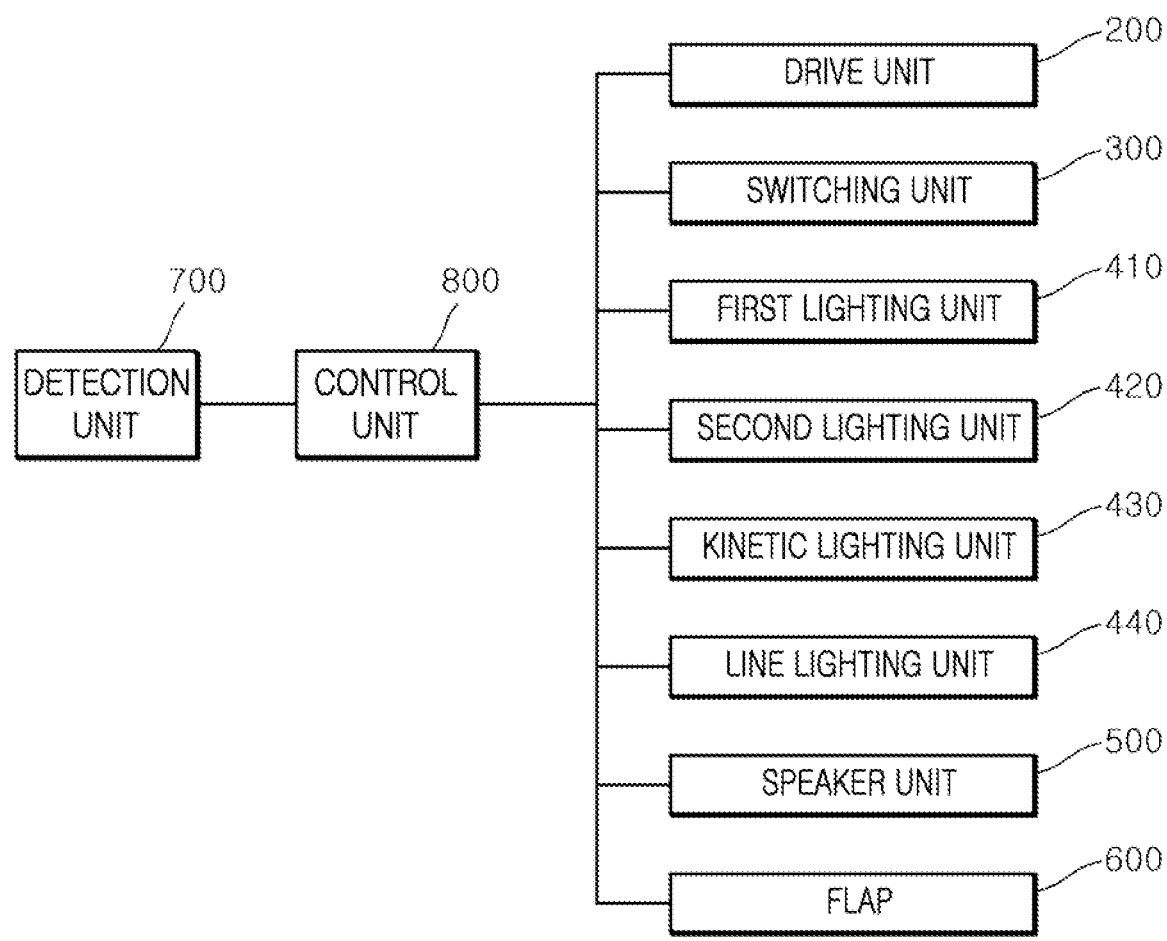
FIG. 5 is a block diagram schematically illustrating a configuration of the pillar module according to the first embodiment of the present disclosure.

FIG. 3 is a perspective view schematically illustrating a configuration of the pillar module according to the first embodiment of the present disclosure, FIG. 4 is a perspective view illustrating a configuration of the pillar module according to the first embodiment of the present disclosure when viewed at a point in time different from a point in time in FIG. 3, and FIG. 5 is a block diagram schematically illustrating a configuration of the pillar module according to the first embodiment of the present disclosure.

Referring to FIGS. 3 to 5, the pillar module 20 according to the present embodiment includes a pillar body 100, a drive unit 200, a switching unit 300, a first lighting unit 410, a second lighting unit 420, a kinetic lighting unit 430, a line lighting unit 440, a speaker unit 500, a flap 600, a detection unit 700, and a control unit 800.

The pillar body 100 defines a schematic external appearance of the pillar module 20 and entirely supports the drive unit 200, the switching unit 300, the first lighting unit 410, the second lighting unit 420, the kinetic lighting unit 430, the line lighting unit 440, the speaker unit 500, the flap 600, and the detection unit 700 which will be described below. The pillar body 100 according to the present embodiment may be provided in the form of a box or wheel housing opened at an outer side thereof and having an empty interior at a lower side thereof. Therefore, the pillar body 100 may provide a space at the lower side thereof so that the drive unit 200 to be described below may be installed in the space. An upper side of the pillar body 100 may be provided in the form of a column extending in an upward/downward direction. However, the shape of the pillar body 100 is not limited to the shape illustrated in FIGS. 3 and 4. The pillar body 100 may be variously changed in design within the technical spirit of the shape in order to entirely support the drive unit 200, the switching unit 300, the first lighting unit 410, the second lighting unit 420, the kinetic lighting unit 430, the line lighting unit 440, the speaker unit 500, the flap 600, and the detection unit 700.

The pillar body 100 may have an accommodation portion 110 for accommodating the switching unit 300, the first lighting unit 410, and the second lighting unit 420 which will be described below. The accommodation portion 110 according to the present embodiment may be provided in the form of a groove concavely extending toward the inside of the pillar body 100 from a front surface of the pillar body 100 disposed to be directed toward a front or rear side of the vehicle. The accommodation portion 110 may be disposed at a lower side of the pillar body 100. An opening side 111a may be formed in one surface of the accommodation portion 110 and connect an internal space of the accommodation portion 110 and an external space of the accommodation portion 110. The opening side 111a may be disposed on the same plane as the front surface of the pillar body 100. The cross-sectional shape and cross-sectional area of the accommodation portion 110 are not limited to the shapes or areas illustrated in FIGS. 3 and 4. The accommodation portion 110 may be variously changed in design depending on the specifications of the switching unit 300, the first lighting unit 410, and the second lighting unit 420 which will be described below.

The drive unit 200 is connected to the pillar body 100 and supports the pillar body 100 so that the pillar body 100 is movable. More specifically, the drive unit 200 is connected to the pillar body 100 and configured to perform overall functions such as a driving function, a braking function, a suspension function, and a steering function of the vehicle. Examples of the drive unit 200 according to the present embodiment may include various types of independent drive wheels each including a wheel rotatably installed in the internal space at the lower side of the pillar body 100, an in-wheel motor configured to provide a rotational force to the wheel, a suspension configured to support the wheel on the pillar body 100, and a steering actuator configured to adjust a steering angle of the wheel by generating a rotational force. An operation of the drive unit 200 may be adjusted by the control operation of the control unit 800 or operations of a steering wheel, an accelerator, and a brake pedal made by a driver.

The switching unit 300 is installed on the pillar body 100 and connected to the first lighting unit 410 and the second lighting unit 420 which will be described below. The switching unit 300 selectively exposes the first lighting unit 410 and the second lighting unit 420 externally (i.e., to the outside) of the pillar body 100. More specifically, the switching unit 300 is installed in the accommodation portion 110 and serves to adjust positions of the first lighting unit 410 and the second lighting unit 420 so that the first lighting unit 410 and the second lighting unit 420 selectively face the opening side 110a in the accommodation portion 110 by driving power thereof. Therefore, the switching unit 300 may improve spatial utilization and an overall aesthetic appearance of the product in comparison with a case in which the first lighting unit 410 and the second lighting unit 420, which generate or create different lighting patterns, are installed at different positions on the pillar body 100.

Figure 6:
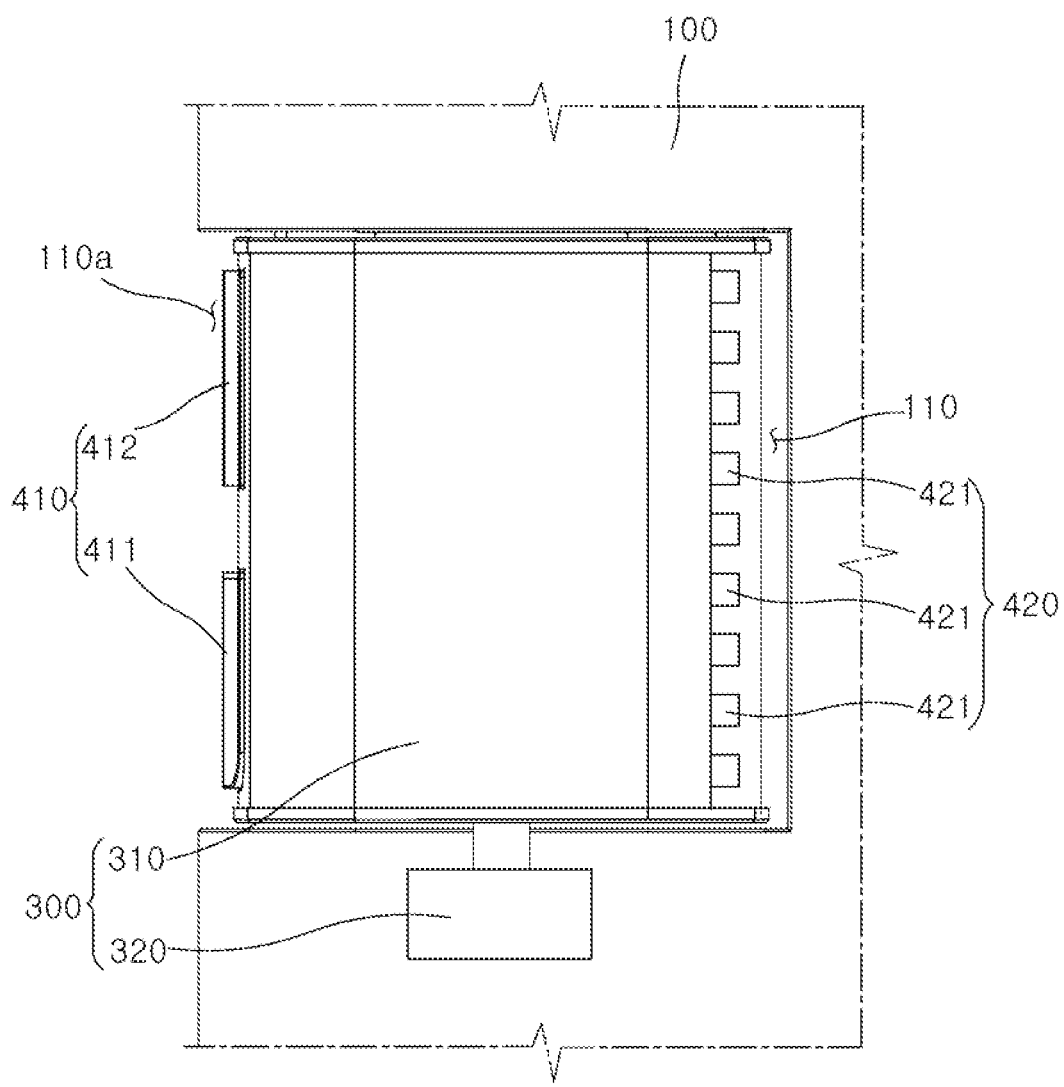
FIG. 6 is a cross-sectional view schematically illustrating a configuration of a switching unit according to the first embodiment of the present disclosure.

FIG. 6 is a cross-sectional view schematically illustrating a configuration of the switching unit according to the first embodiment of the present disclosure.

Referring to FIG. 6, the switching unit 300 according to the present embodiment includes a switching case 310 and a switching actuator 320.

The switching case 310 is rotatably installed in the accommodation portion 110 and supports the first lighting unit 410 and the second lighting unit 420. The switching case 310 according to the present embodiment may be formed to have an approximately box shape and disposed in the accommodation portion 110. The switching case 310 may be supported in the accommodation portion 110 so as to be rotatable about a central axis thereof. In this case, the central axis of the switching case 310 may be disposed in parallel with the opening side 110a of the accommodation portion 110. For example, the central axis of the switching case 310 may be disposed in parallel with a height direction of the pillar body 100, i.e., a direction perpendicular to the ground surface. The switching case 310 may be formed so that a cross-section perpendicular to the central axis has a polygonal shape. In this case, a peripheral surface of the switching case 310 may have a shape made by disposing a plurality of flat surfaces at predetermined angles around the central axis of the switching case 310. Therefore, in case that the first lighting unit 410 or the second lighting unit 420, which will be described below, faces the opening side 110a, the switching case 310 may guide light, which is emitted from the first lighting unit 410 or the second lighting unit 420, so that the light is emitted to the outside of the pillar body 100 through the opening side 110a.

The switching actuator 320 is connected to the switching case 310 and generates a rotational force to rotate the switching case 310 about the central axis. Examples of the switching actuator 320 according to the present embodiment may include various types of electric motors that generate the rotational force by receiving power from the outside. The switching actuator 320 may be disposed in the pillar body 100. An output shaft of the switching actuator 320 may be connected directly to the switching case 310 and transmit the rotational force to the switching case 310. Alternatively, the output shaft of the switching actuator 320 may be connected to the switching case 310 by means of a separate gear or the like and transmit the rotational force to the switching case 310. The switching actuator 320 may be electrically connected to the control unit 800, and an operation of the switching actuator 320 may be adjusted under the control of the control unit 800.

The first lighting unit 410 is installed on the pillar body 100 and generate or creates a first lighting pattern. More specifically, the first lighting unit 410 may be disposed in the accommodation portion 110 and connected to a side of the switching case 310. When the switching case 310 rotates, the first lighting unit 410 may rotate together with the switching case 310 in the accommodation portion 110, such that a relative position of the first lighting unit 410 with respect to the opening side 110a may vary. In case that the first lighting unit 410 faces the opening side 110a, the first lighting unit 410 may be exposed to the outside of the pillar body 100 and display the first lighting pattern, which is created through the opening side 110a, to the outside of the pillar body 100.

Figure 7:
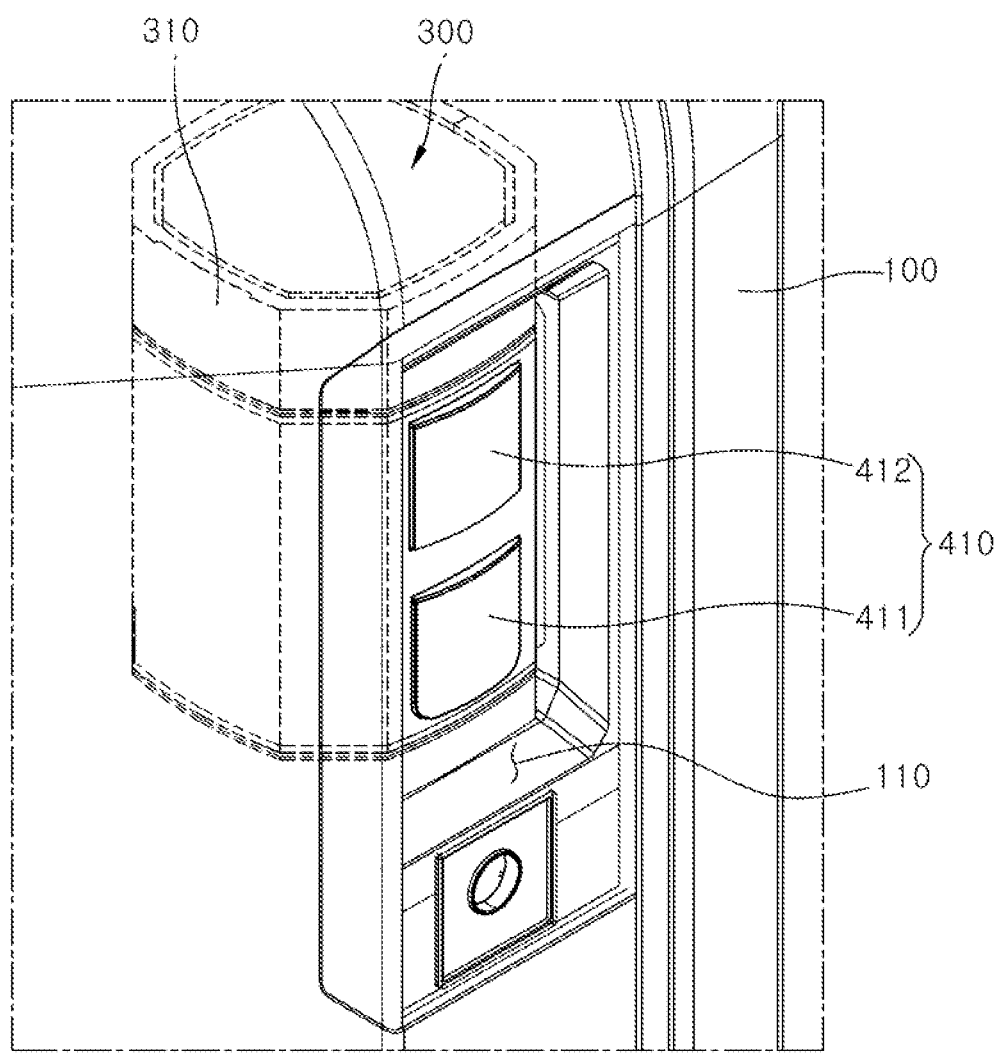
FIG. 7 is a perspective view schematically illustrating a configuration of a first lighting unit according to the first embodiment of the present disclosure.

FIG. 7 is a perspective view schematically illustrating a configuration of the first lighting unit according to the first embodiment of the present disclosure.

Referring to FIG. 7, the first lighting unit 410 according to the present embodiment may include a road surface illumination lamp 411 and a headlamp 412. In this case, the first lighting pattern, which is created by the first lighting unit 410, may mean a lighting pattern displayed to the outside of the pillar body 100 by the road surface illumination lamp 411, the headlamp 412, or a combination thereof.

The road surface illumination lamp 411 is connected to any one of peripheral surfaces of the switching case 310 and rotates together with the switching case 310. The road surface illumination lamp 411 faces the opening side 110a and emits an optical image toward the road surface. For example, the road surface illumination lamp 411 according to the present embodiment may be a projection device configured to project an optical image printed on a film or the like or a beam projector configured to project a recorded digital image. A central axis of a lens of the road surface illumination lamp 411, which emits an optical image, is disposed to be inclined downward at a predetermined angle with respect to a direction parallel to the ground surface. Therefore, the road surface illumination lamp 411 may guide the optical image emitted to the outside of the pillar body 100 so that the optical image is displayed on the road surface. Whether to turn on or off the road surface illumination lamp 411 may be adjusted under the control of the control unit 800 to be described below.

The headlamp 412 is spaced apart from the road surface illumination lamp 411 and rotates together with the switching case 310. The headlamp 412 may be connected to the peripheral surface, which is identical to the peripheral surface to which the road surface illumination lamp 411 is connected among the peripheral surfaces of the switching case 310. For example, the headlamp 412 may be spaced apart from the road surface illumination lamp 411 in a vertical direction (i.e., an upward/downward direction) on the same peripheral surface of the switching case 310. As the headlamp 412 faces the opening side 110a, the headlamp 412 emits a beam pattern such as a low beam or a high beam to the outside of the pillar body 100. Examples of the headlamp 412 according to the present embodiment may include various types of headlamp devices that include light sources, reflectors, lenses, and the like and illuminate a traveling route of the vehicle. Whether to turn on or off the headlamp 412 may be adjusted under the control of the control unit 800 to be described below.

The second lighting unit 420 is spaced apart from the first lighting unit 410 and generate or creates a second lighting pattern. More specifically, the second lighting unit 420 may be disposed in the accommodation portion 110 and connected to the other side of the switching case 310. When the switching case 310 rotates, the second lighting unit 420 may rotate together with the switching case 310 in the accommodation portion 110, such that a relative position of the second lighting unit 420 with respect to the opening side 110a may vary. In case that the second lighting unit 420 faces the opening side 110a, the second lighting unit 420 may be exposed to the outside of the pillar body 100 and display the second lighting pattern, which is created through the opening side 110a, to the outside of the pillar body 100. In this case, in case that the first lighting unit 410 faces the opening side 110a, the second lighting unit 420 may be disposed to face an inner surface of the accommodation portion 110. Therefore, the first lighting unit 410 and the second lighting unit 420 may be selectively exposed to the outside of the pillar body 100.

Figure 8:
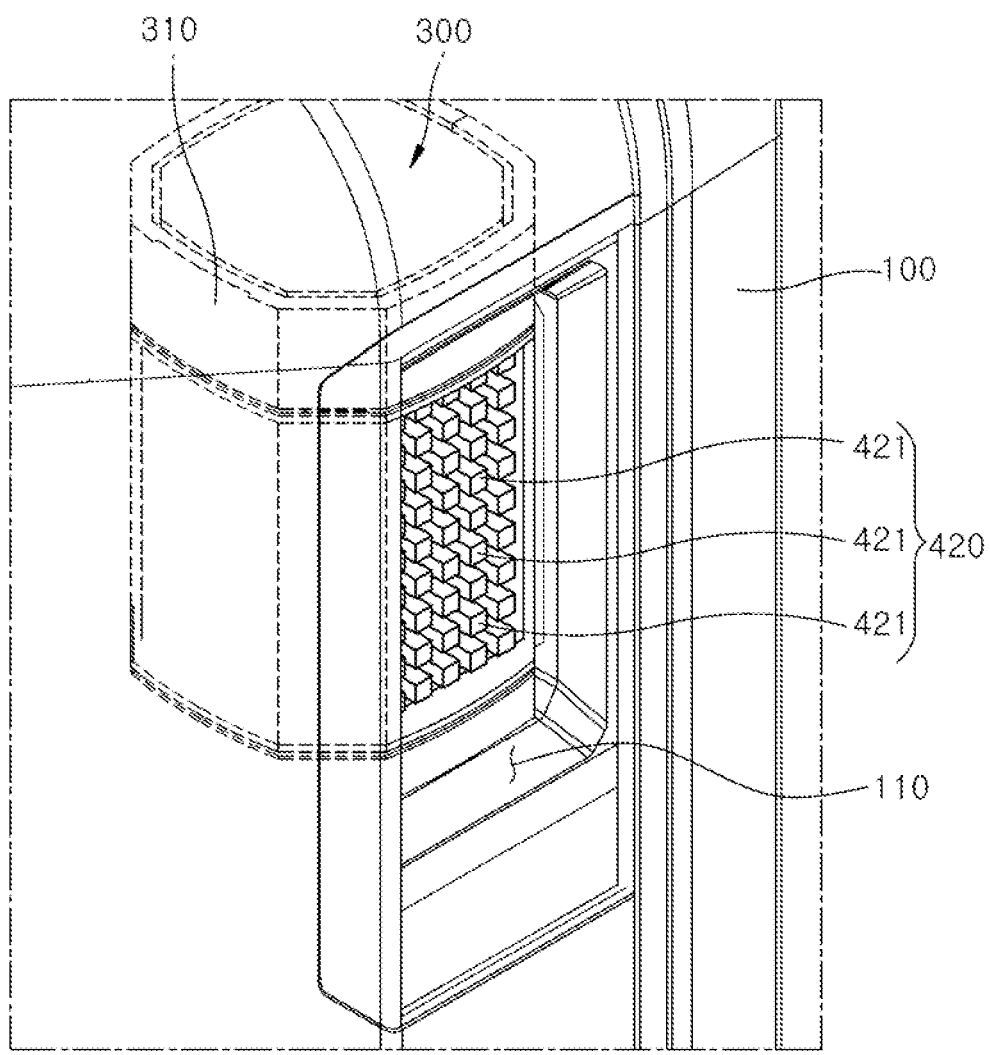
FIG. 8 is a perspective view schematically illustrating a configuration of a second lighting unit according to the first embodiment of the present disclosure.

FIG. 8 is a perspective view schematically illustrating a configuration of the second lighting unit according to the first embodiment of the present disclosure.

Referring to FIG. 8, the second lighting unit 420 according to the first embodiment of the present disclosure may include a plurality of pixel lamps 421. In this case, the second lighting pattern created by the second lighting unit 420 may mean a lighting pattern displayed to the outside of the pillar body 100 by the plurality of pixel lamps 421.

The plurality of pixel lamps 421 may rotate together with the switching case 310 and be independently turned on or off. The plurality of pixel lamps 421 may be connected to a peripheral surface which is different from the peripheral surface to which the first lighting unit 410 is connected among the peripheral surfaces of the switching case 310. The plurality of pixel lamps 421 may be arranged in the form of a lattice on the peripheral surface of the switching case 310. For example, the plurality of pixel lamps 421 may be arranged in two or more rows in the horizontal and vertical directions on the peripheral surface of the switching case 310. For example, each of the pixel lamps 421 according to the present embodiment may be an light-emitting diode (LED) lamp that may emit light by receiving power from the outside. The turned-on state of each of the plurality of pixel lamps 421 may be independently adjusted under the control of the control unit 800 to be described below.

The kinetic lighting unit 430 is movably installed on the pillar body 100 and creates a kinetic lighting pattern. More specifically, the kinetic lighting unit 430 serves to create a lighting pattern made by a combination of a lighting signal, which is made by light, and a dynamic signal that is made by a physical motion for interacting with an object such as a pedestrian positioned outside the pillar body 100. The kinetic lighting unit 430 may be disposed above the first lighting unit 410 and the second lighting unit 420. Therefore, the kinetic lighting unit 430 may be disposed at a position adjacent to a height of the eyes of the pedestrian positioned outside the pillar body 100, thereby further improving visibility of the lighting pattern.

Figure 9:
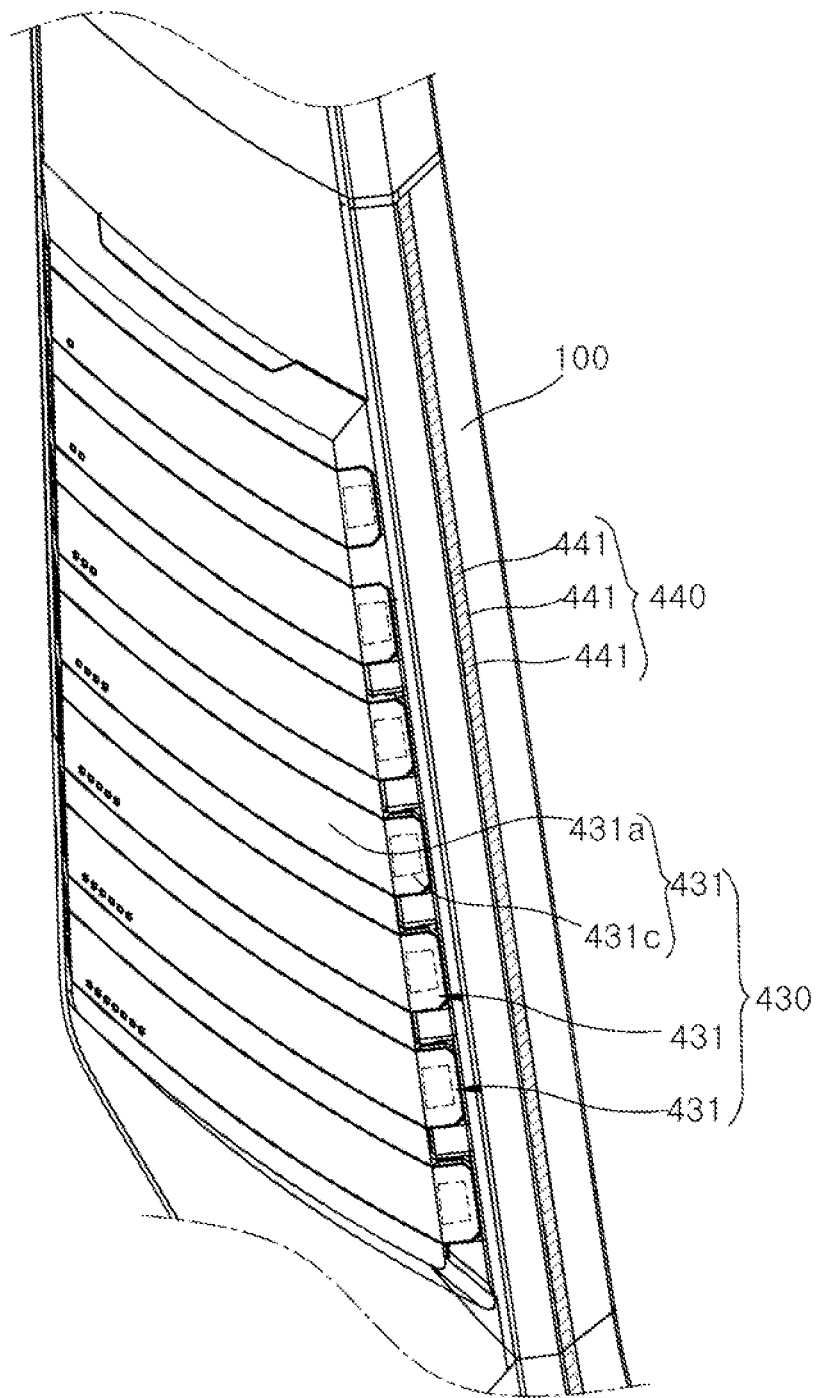
FIG. 9 is a perspective view schematically illustrating a configuration of a kinetic lighting unit according to the first embodiment of the present disclosure.
Figure 10:
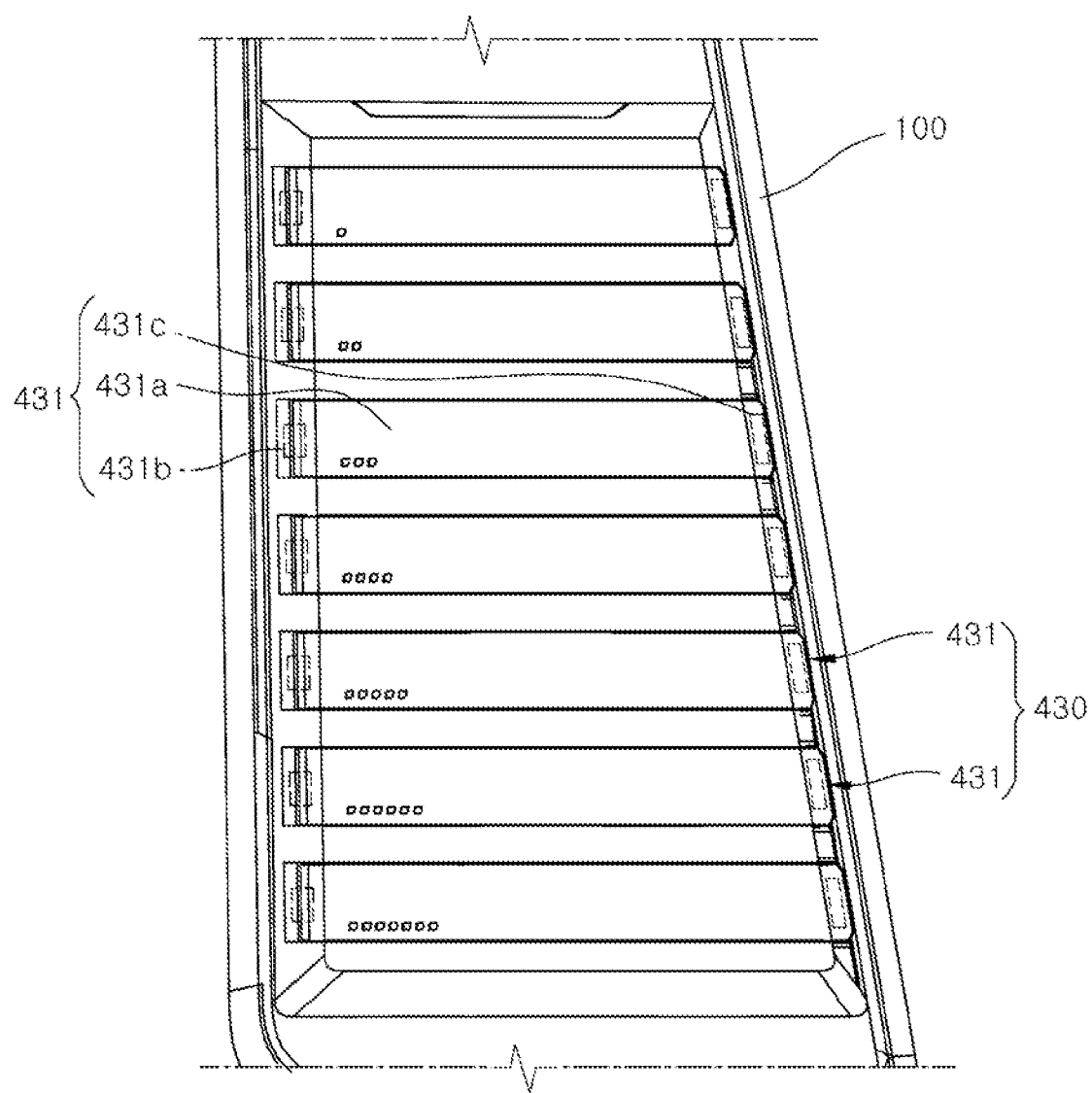
FIG. 10 is a front view schematically illustrating a configuration of the kinetic lighting unit according to the first embodiment of the present disclosure.
Figure 11:
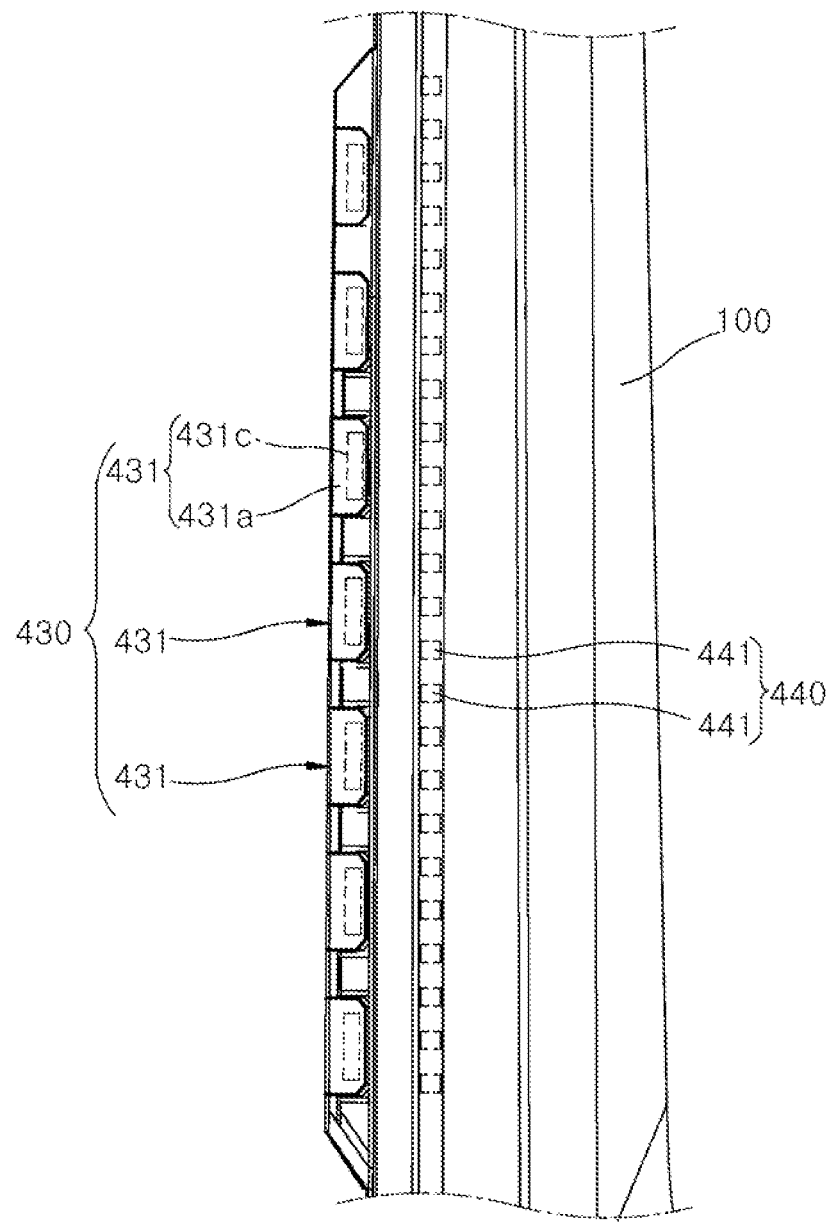
FIGS. 11 and 12 are side views schematically illustrating a configuration of the kinetic lighting unit according to the first embodiment of the present disclosure.
Figure 12:
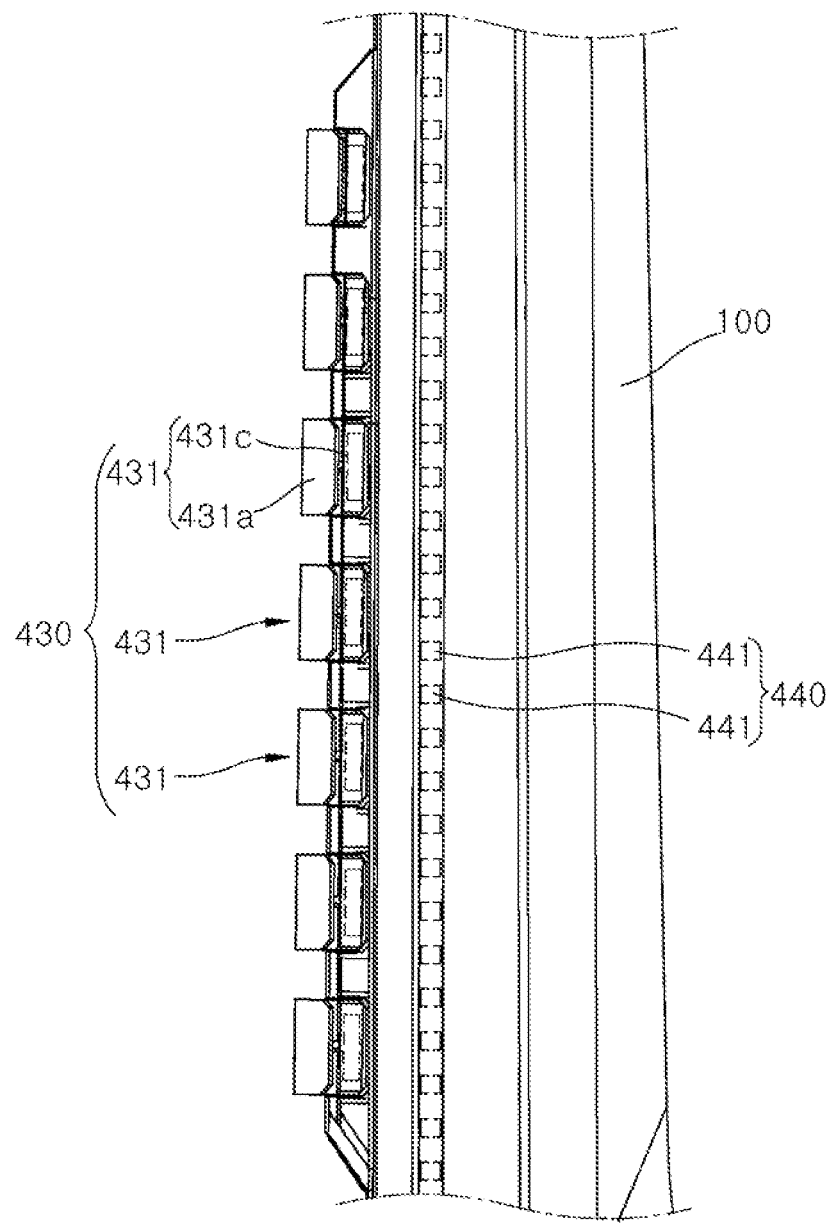

FIG. 9 is a perspective view schematically illustrating a configuration of the kinetic lighting unit according to the first embodiment of the present disclosure, FIG. 10 is a front view schematically illustrating a configuration of the kinetic lighting unit according to the first embodiment of the present disclosure, and FIGS. 11 and 12 are side views schematically illustrating a configuration of the kinetic lighting unit according to the first embodiment of the present disclosure.

Referring to FIGS. 9 to 12, the kinetic lighting unit 430 according to the first embodiment of the present disclosure may include a plurality of kinetic lighting members 431. In this case, the kinetic lighting pattern created by the kinetic lighting unit 430 may mean a lighting pattern displayed to the outside of the pillar body 100 by operations of the plurality of kinetic lighting members 431.

The plurality of kinetic lighting members 431 may be disposed at a central portion of the pillar body 100, more specifically disposed between the accommodation portion 110 and the detection unit 700 to be described below. The plurality of kinetic lighting members 431 may be installed on the pillar body 100 so as to be independently moved and turned on or off. The plurality of kinetic lighting members 431 may be spaced apart from one another at predetermined intervals in the upward/downward direction in the height direction of the pillar body 100. The plurality of kinetic lighting members 431 may create various types of kinetic lighting patterns while being independently moved and turned on or off under the control of the control unit 800 to be described below.

The kinetic lighting member 431 according to the present embodiment includes a kinetic panel 431a, a kinetic actuator 431b, and a kinetic lamp 431c.

The kinetic panel 431a may be formed to have a rod shape having an empty interior and opened at a side thereof. The kinetic panel 431a may be disposed so that the open side thereof is directed toward the pillar body 100. The open side of the kinetic panel 431a may be inserted within the pillar body 100. In this case, the kinetic panel 431a may be inserted into an inner surface of the pillar body 100 facing the main cabin 30, which will be described below, between two opposite lateral surfaces of the pillar body 100. Alternatively, the kinetic panel 431a may be inserted into an outer surface of the pillar body 100 disposed to be directed toward the outside of the vehicle. The closed side of the kinetic panel 431a may be disposed on the same plane as the outer surface of the pillar body 100. That is, the closed side of the kinetic panel 431a may be disposed to define a continuous plane together with the outer surface of the pillar body 100.

The kinetic panel 431a may be disposed so that a longitudinal direction thereof is parallel to a forward/rearward direction of the pillar body 100, i.e., an extension direction of the accommodation portion 110. A side of the kinetic panel 431a may be disposed to be directed toward a rear surface of the pillar body 100, i.e., a side opposite to the side at which the opening side 110a is defined. The other side of the kinetic panel 431a may be disposed to be directed toward the front surface of the pillar body 100, i.e., the same side at which the opening side 110*a* is defined.

A side of the kinetic panel 431*a* may be rotatably connected to the pillar body 100. In this case, the side of the kinetic panel 431*a* may be supported to be rotatable about the height direction of the pillar body 100, i.e., the direction perpendicular to the ground surface. The other side of the kinetic panel 431*a* may protrude outwardly from the pillar body 100 or be inserted within into the pillar body 100 depending on the rotation direction. In case that the other side of the kinetic panel 431*a* protrudes outwardly from the pillar body 100, an empty space may be defined between the kinetic panel 431*a* and the pillar body 100.

The kinetic actuator 431*b* is connected to a side of the kinetic panel 431*a* and generates a rotational force to rotate the kinetic panel 431*a*. Examples of the kinetic actuator 431*b* according to the present embodiment may include various types of electric motors that generate the rotational force by receiving power from the outside. The kinetic actuator 431*b* may be disposed in the pillar body 100. An output shaft of the kinetic actuator 431*b* may be connected directly to a side of the kinetic panel 431*a* and transmit the rotational force to the kinetic panel 431*a*. Alternatively, the output shaft of the kinetic actuator 431*b* may be connected to a side of the kinetic panel 431*a* by means of a separate gear and transmit the rotational force to the kinetic panel 431*a*. The kinetic actuator 431*b* may be electrically connected to the control unit 800 to be described below, and an operation of the kinetic actuator 431*b* may be adjusted under the control of the control unit 800.

The kinetic lamp 431*c* may be provided to be turned on or off. The kinetic lamp 431*c* is exposed to the outside of the pillar body 100 as the other side of the kinetic panel 431*a* protrudes outwardly from the pillar body 100. Examples of the kinetic lamp 431*c* according to the present embodiment may include various types of LED lamps that may generate light by receiving power from the outside. The kinetic lamp 431*c* may be disposed between the open side of the kinetic panel 431*a* and the pillar body 100. The kinetic lamp 431*c* may be disposed at an end of the other side of the kinetic panel 431*a*. Therefore, the kinetic lamp 431*c* may be exposed to the outside of the pillar body 100 as the other side of the kinetic panel 431*a* protrudes outwardly from the pillar body 100 and the empty space is defined between the kinetic panel 431*a* and the pillar body 100. In this case, the kinetic lamp 431*c* may be connected integrally with the other side of the kinetic panel 431*a* and rotate together with the other side of the kinetic panel 431*a*. Alternatively, the kinetic lamp 431*c* may be separated from the kinetic panel 431*a* and fixed in position between the kinetic panel 431*a* and the pillar body 100. The turned-on state of the kinetic lamp 431*c* may be adjusted under the control of the control unit 800.

The line lighting unit 440 extends in the upward/downward direction along the outer surface of the pillar body 100 and creates a line lighting pattern. The line lighting unit 440 may be disposed on the front surface of the pillar body 100, i.e., at a side identical to the side at which the opening side 110*a* is defined.

Referring to FIGS. 9 and 11, the line lighting unit 440 according to the present embodiment may include a plurality of line lamps 441. In this case, the line lighting pattern created by the line lighting unit 440 may mean a lighting pattern displayed to the outside of the pillar body 100 by operations of the plurality of line lamps 441.

The plurality of line lamps 441 may be spaced apart from one another in the extension direction of the line lighting unit 440. The plurality of line lamps 441 may be installed to be independently turned on or off. Therefore, only the plurality of line lamps 441 in a partial section of the entire section of the line lighting unit 440 may be turned on, thereby implementing various types of lighting patterns. Examples of the line lamps 441 according to the present embodiment may include various types of LED lamps that may generate light by receiving power from the outside. The turned-on state of each of the plurality of line lamps 441 may be independently adjusted under the control of the control unit 800 to be described below.

The speaker unit 500 is installed on the pillar body 100 and outputs sound to the outside of the pillar body 100. The speaker unit 500 according to the present embodiment may be a directional speaker that outputs sound at a predetermined angle in a particular direction or about the particular direction. Therefore, the speaker unit 500 may output and guide sound so that the sound is concentrated on an object positioned outside the pillar body 100, thereby improving the recognition efficiency and preventing the occurrence of noise. The speaker unit 500 may be disposed in the pillar body 100. The speaker unit 500 may be disposed between the accommodation portion 110 and the kinetic lighting unit 430. The speaker unit 500 may be disposed to be inclined at a predetermined angle toward the upper side of the pillar body 100. That is, the speaker unit 500 may be disposed so that a direction in which sound is transmitted is inclined upward at a predetermined angle with respect to the direction parallel to the ground surface.

The flap 600 faces the drive unit 200 and prevents air from being introduced between the pillar body 100 and the drive unit 200. Therefore, the flap 600 may prevent deterioration in traveling performance and fuel economy caused by air resistance.

Figure 13:
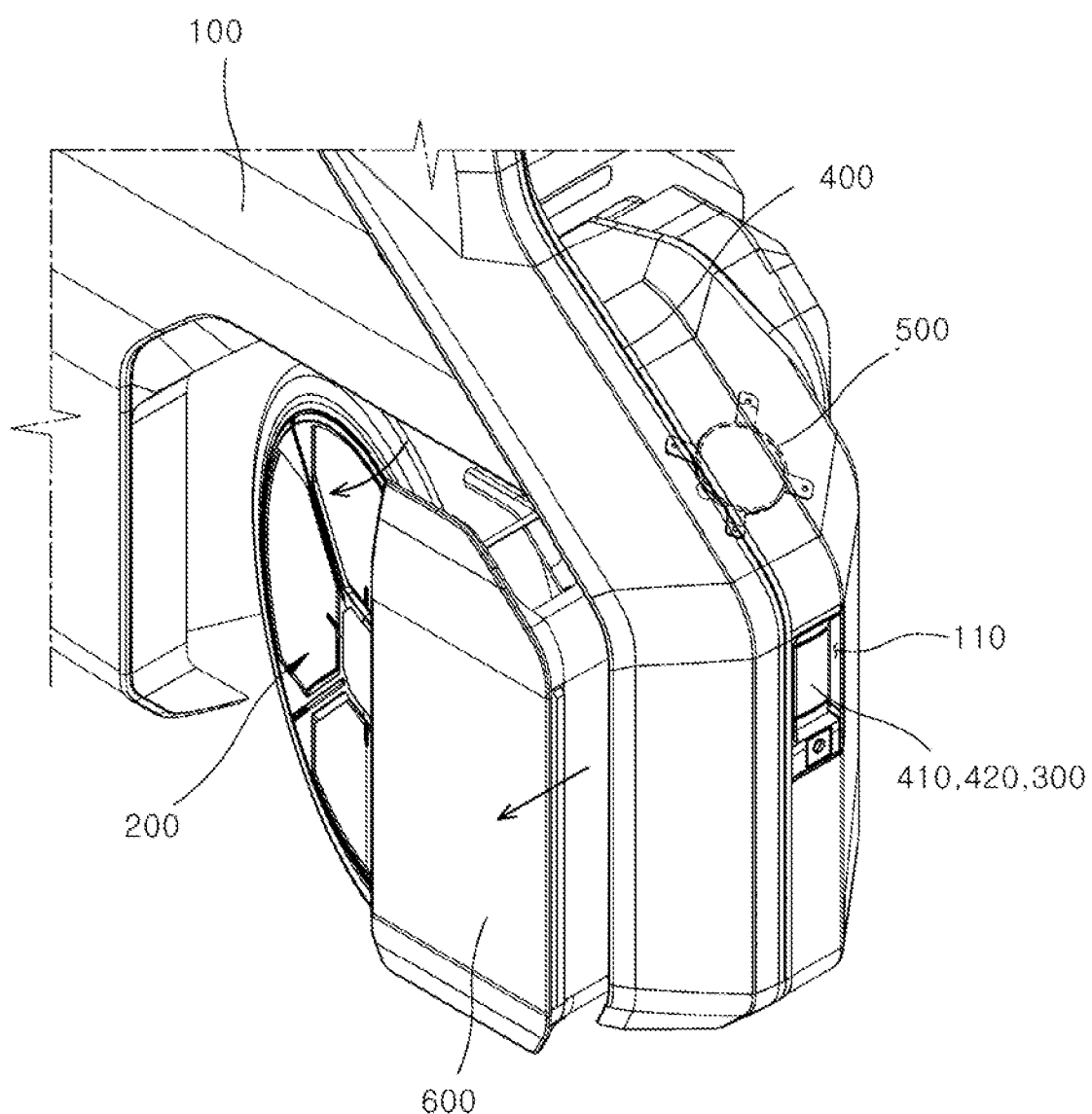
FIG. 13 is an enlarged view schematically illustrating an operating state of a flap according to the first embodiment of the present disclosure.

Referring to FIG. 3, the flap 600 according to the present embodiment may be formed to have an approximately plate shape. An inner surface of the flap 600 may face an outer surface of the drive unit 200. FIG. 3 illustrates an example in which the single flap 600 is formed for any one pillar body 100. However, the flap 600 is not limited thereto, and a plurality of flaps 600 may be formed for any one pillar body 100. The flap 600 may be movably connected to the pillar body 100 and move in conjunction with a steering operation of the drive unit 200. The flap 600 according to the present embodiment may be slidably connected to the pillar body 100 by means of a guide rail or the like. In this case, the flap 600 may be supported to be slidable in a direction parallel to a width direction of the pillar body 100. The flap 600 may include a power device (not illustrated) such as an electric motor or a hydraulic cylinder and slide by receiving driving power from the power device. In this case, an operation of the flap 600 may be adjusted under the control of the control unit 800 to be described below. Therefore, the flap 600 may guide a smooth steering operation of the drive unit 200. FIG. 13 is an enlarged view schematically illustrating an operating state of the flap according to the first embodiment of the present disclosure.

Referring to FIG. 13, the wheel of the drive unit 200 protrudes from a lateral surface of the pillar body 100 when the vehicle turns.

Because the wheel of the drive unit 200 protrudes from the lateral surface of the pillar body 100, the flap 600 slides toward the outside of the pillar body 100 under the control of the control unit 800 and is prevented from coming into contact with the drive unit 200.

A movement amount of the flap 600 may increase in proportion to a steering angle of the wheel of the drive unit 200.

Thereafter, when a steering angle set to the wheel of the drive unit 200 is eliminated so that the vehicle travels straight, the flap 600 may return to an initial position while sliding toward the pillar body 100 under the control of the control unit 800.

The detection unit 700 is installed on the pillar body 100 and detects an object at the periphery of the pillar body 100. In this case, examples of the object at the periphery of the pillar body 100 may include various types of objects such as pedestrians, the driver, obstacles that may be positioned at the periphery of the pillar body 100. The detection unit 700 may be disposed at the upper side of the pillar body 100, more specifically, above the kinetic lighting unit 430. Therefore, a detection range in which the detection unit 700 detects an object may be expanded in comparison with the case in which the detection unit 700 is disposed at a lower side of the pillar body 100.

Figure 14:
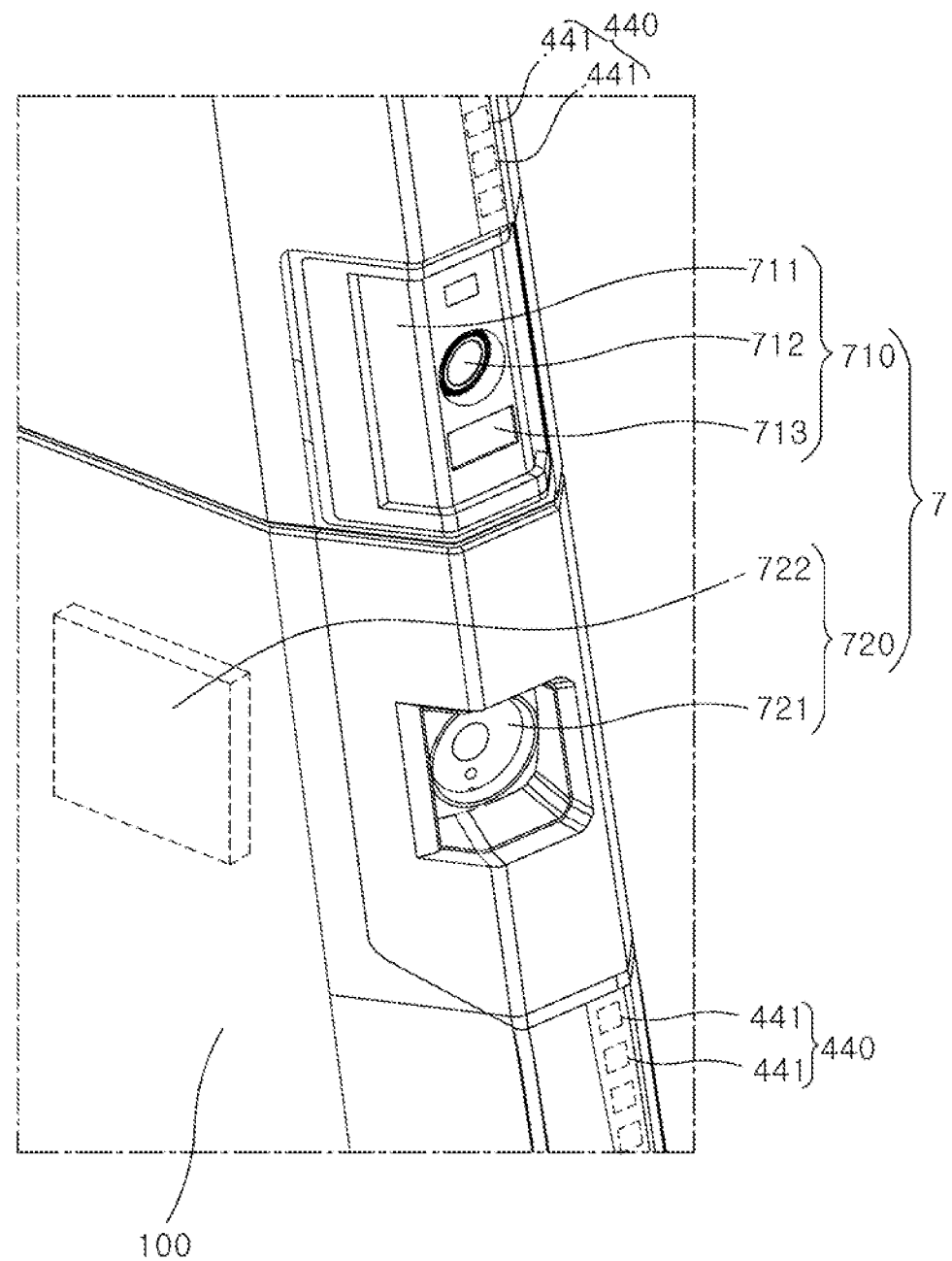
FIG. 14 is an enlarged view schematically illustrating a configuration of a detection unit according to the first embodiment of the present disclosure.

FIG. 14 is an enlarged view schematically illustrating a configuration of the detection unit according to the first embodiment of the present disclosure.

Referring to FIG. 14, the detection unit 700 according to the present embodiment may include a first detection member 710 and a second detection member 720.

The first detection member 710 is rotatably installed on the pillar body 100 and rotates in conjunction with a change to a relative position of an object with respect to the pillar body 100 or a relative position between the pillar body 100 and an object.

The first detection member 710 according to the present embodiment may include a first detection body 711, a vision sensor 712, and a lidar sensor 713.

The first detection body 711 may be disposed in the pillar body 100, and one surface of the first detection body 711 may be exposed to the outside of the pillar body 100. The first detection body 711 may be connected to the pillar body 100 so as to be rotatable about an axis in height direction of the pillar body 100, i.e., the direction perpendicular to the ground surface. The first detection body 711 is connected to the vision sensor 712 and the lidar sensor 713, which will be described below, and entirely supports the vision sensor 712 and the lidar sensor 713. In addition, the first detection body 711 may be connected to an electric motor (not illustrated) or the like that operates under the control of the control unit 800, such that a rotation angle of the first detection body 711 may be adjusted. The first detection body 711 may change the positions of the vision sensor 712 and the lidar sensor 713 while being rotated relative to the pillar body 100 by the operation of the electric motor. Therefore, the first detection body 711 may expand the detection ranges of the vision sensor 712 and the lidar sensor 713 each having a relatively small angle of view.

The vision sensor 712 and the lidar sensor 713 may acquire three-dimensional images of the periphery of the pillar body 100 and detect position information, distance information, direction information, speed information, and the like of the object at the periphery of the pillar body 100 on the basis of the acquired images. The vision sensor 712 may be implemented as a dynamic vision sensor (DVS). The lidar sensor 713 may be implemented by a TOF (time of flight) manner or a phase-shift manner. The vision sensor 712 and the lidar sensor 713 may be connected to one surface of the first detection body 711 and exposed to the outside of the pillar body 100. When the first detection body 711 rotates, the vision sensor 712 and the lidar sensor 713 rotate together with the first detection body 711 relative to the pillar body 100. The vision sensor 712 and the lidar sensor 713 may be electrically connected to the control unit 800 and transmit the detected data to the control unit 800.

In addition, the first detection member 710 may of course include any sensor that may acquire information on the object at the periphery of the pillar body 100 while rotating relative to the pillar body 100 even though the sensor is not described above.

The second detection member 720 is fixed to the pillar body 100 and detects the object at the periphery of the pillar body 100.

The second detection member 720 according to the present embodiment may include a camera 721 configured to capture a two-dimensional image of the periphery of the pillar body 100, and a radar sensor 722 configured to detect distance information of the object positioned at the periphery of the pillar body 100 by using an electromagnetic wave.

The camera 721 may be disposed below the first detection member 710. The camera 721 may be electrically connected to the control unit 800 and transfer information on the captured two-dimensional image of the periphery of the pillar body 100 to the control unit 800.

The radar sensor 722 may be disposed in the pillar body 100. The radar sensor 722 may be electrically connected to the control unit 800 and transmit the detected data to the control unit 800.

In addition, the second detection member 720 may of course include any sensor that may be fixed to the pillar body 100 and additionally acquire information on the object at the periphery of the pillar body 100 even though the sensor is not described above.

The control unit 800 controls the overall operations of the drive unit 200, the switching unit 300, the first lighting unit 410, the second lighting unit 420, the kinetic lighting unit 430, the line lighting unit 440, the speaker unit 500, the flap 600, and the detection unit 700. More specifically, the control unit 800 may control the operations of the drive unit 200, the switching unit 300, the first lighting unit 410, the second lighting unit 420, the kinetic lighting unit 430, the line lighting unit 440, the speaker unit 500, the flap 600, and the detection unit 700 on the basis of data detected by the detection unit 700, data inputted in advance by the user, whether the vehicle is stationary, whether the vehicle is turned on or off, whether the battery is charged, whether the vehicle is steered, and the like.

The control unit 800 may include at least any one of an electronic control unit (ECU), a central processing unit (CPU), a processor, and a system on chip (SoC). The control unit 800 may control a plurality of hardware or software constituent elements by operating an operating system or an application and perform various types of data processing and computation. The control unit 800 may be configured to execute at least one instruction stored in a memory and store data, related to the result of executing the instruction, in the memory. The control unit 800 may include at least any one of a radio frequency (RF) device, a wireless fidelity (Wi-Fi) device, a Bluetooth device, a Zigbee device, and a near field communication (NFC) device that may implement various types of communication protocols that may receive the data detected by the detection unit 700 and the input signal generated from a terminal of the driver or various types of input devices.

Hereinafter, an operation of the pillar module 20 according to the first embodiment of the present disclosure will be described in detail.

Figure 15:
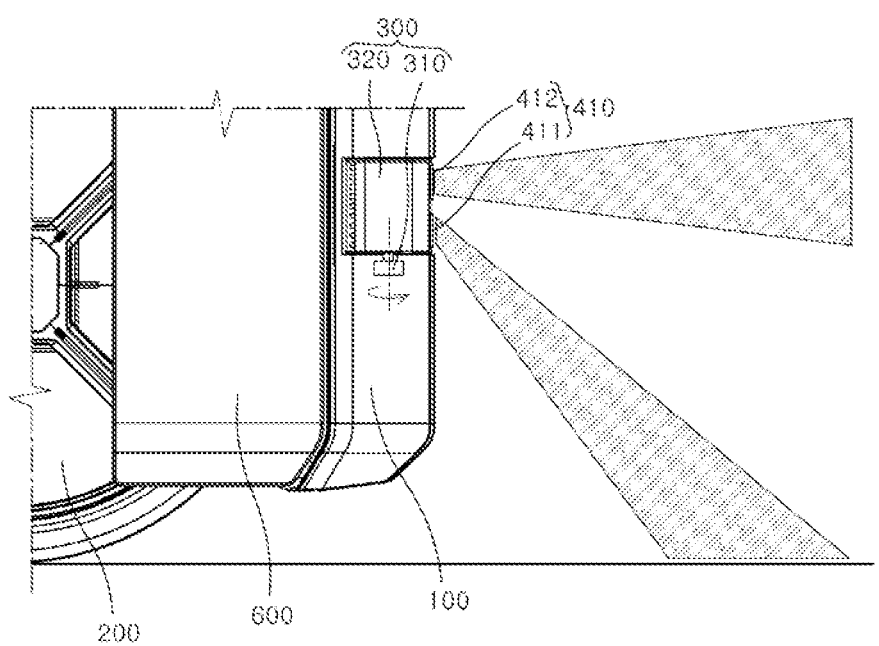
FIG. 15 is a view schematically illustrating an operation of creating a first lighting pattern by the first lighting unit according to the first embodiment of the present disclosure.

FIG. 15 is a view schematically illustrating an operation of creating the first lighting pattern by the first lighting unit according to the first embodiment of the present disclosure.

Referring to FIG. 15, when the control unit 800 determines that the vehicle is turned on, the control unit 800 operates the switching actuator 320 so that the switching case 310 rotates in the direction in which the first lighting unit 410 faces the opening side 110a.

When the first lighting unit 410 faces the opening side 110a and exposed to the outside of the pillar body 100, the control unit 800 operates the road surface illumination lamp 411.

More specifically, when the control unit 800 determines that the vehicle is stationary or moves rearward, the control unit 800 turns on the road surface illumination lamp 411.

The road surface illumination lamp 411 emits an optical image on the road surface at the periphery of the pillar body 100.

Therefore, the road surface illumination lamp 411 indicates a walking direction for a pedestrian by means of the optical image, which makes it possible to ensure safety for the pedestrian and enable the pedestrian to easily recognize the presence of the vehicle.

In addition, the control unit 800 may turn on the headlamp 412 on the basis of the user's input or data detected by a separate illuminance sensor (not illustrated), and the headlamp 412 may emit a beam pattern to the outside of the vehicle.

Figure 16:
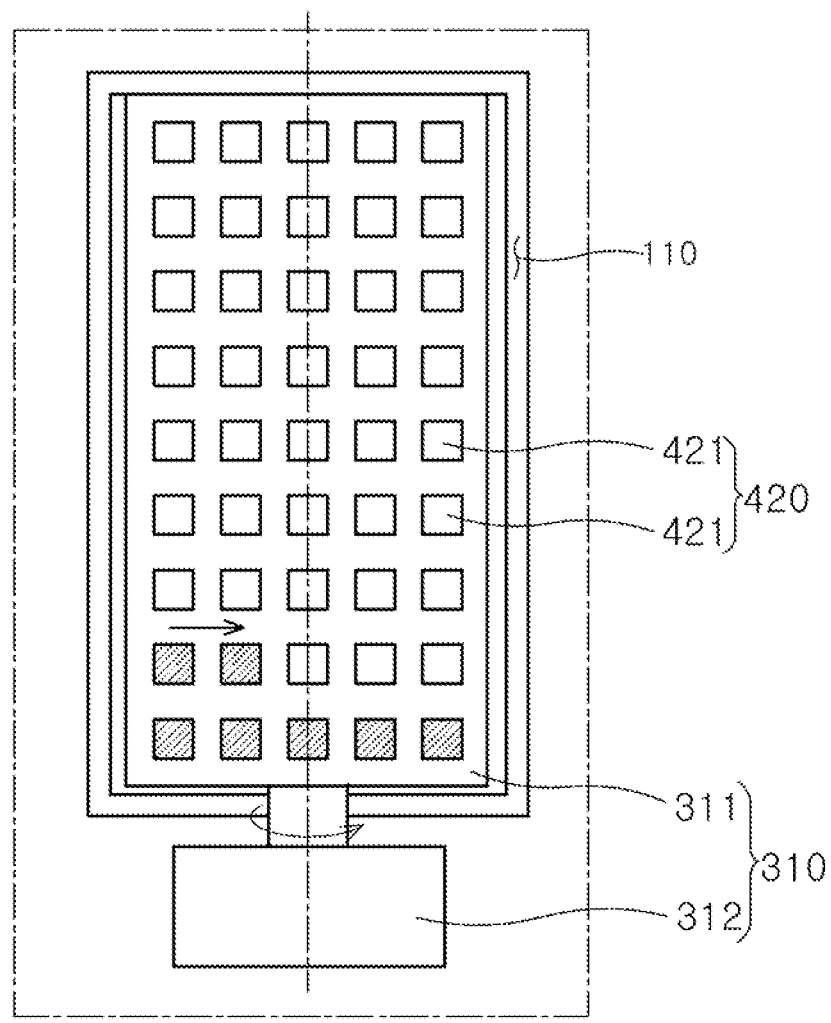
FIG. 16 is a view schematically illustrating an operation of creating a second lighting pattern by the second lighting unit according to the first embodiment of the present disclosure.

FIG. 16 is a view schematically illustrating an operation of creating the second lighting pattern by the second lighting unit according to the first embodiment of the present disclosure.

Referring to FIG. 16, when the control unit 800 determines that the vehicle is turned off or the battery is being charged, the control unit 800 operates the switching actuator 320 so that the switching case 310 rotates in the direction in which the second lighting unit 420 faces the opening side 110a.

In case that the battery is being charged, the control unit 800 may turn on the plurality of pixel lamps 421 in proportion to a charge capacity of the battery.

For example, the control unit 800 may calculate a ratio of the current charge amount of the battery to the maximum charge amount of the battery, turn on the pixel lamps 421 corresponding in number to the calculated ratio among all the pixel lamps 421, and turn off the remaining pixel lamps 421.

Thereafter, as the current charge amount of the battery increases, the control unit 800 may sequentially turn on the turned-off pixel lamps 421 in the preset order.

In this case, the order in which the plurality of pixel lamps 421 is turned on is not limited to the order illustrated in FIG. 16, but may be changed in design to various orders.

Figure 17:
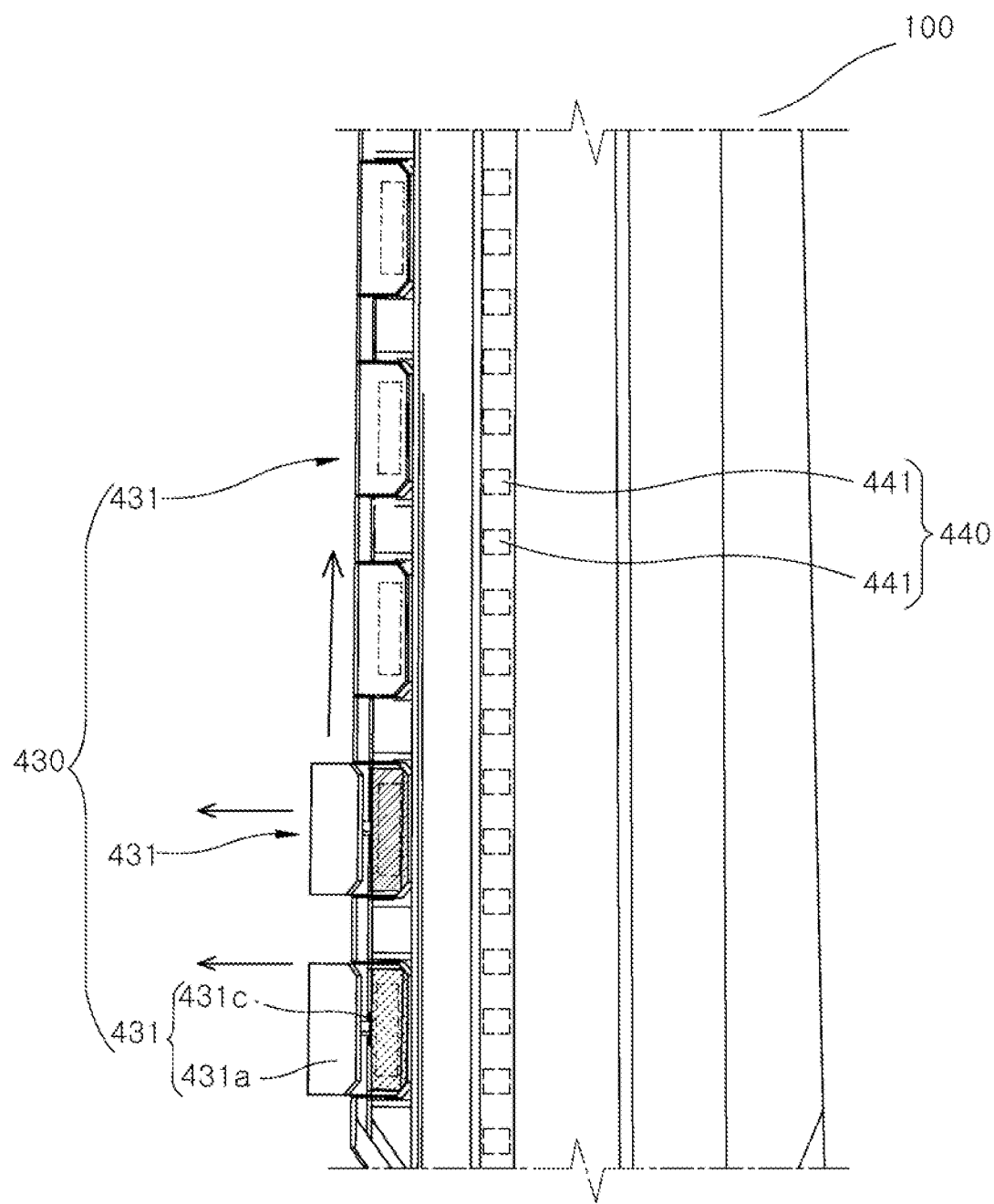
FIG. 17 is a view schematically illustrating an operation of creating a kinetic lighting pattern by the kinetic lighting unit according to the first embodiment of the present disclosure.

FIG. 17 is a view schematically illustrating an operation of creating the kinetic lighting pattern by the kinetic lighting unit according to the first embodiment of the present disclosure.

Referring to FIG. 17, the control unit 800 may operate the kinetic lighting unit 430 when the control unit 800 receives a separate input signal from the user, when the pedestrian is detected by the detection unit 700, or when a preset condition related to charging of the battery or the like is satisfied.

In this case, the control unit 800 may sequentially operate the plurality of kinetic lighting members 431.

For example, the control unit 800 may sequentially operate the plurality of kinetic actuators 431b so that the other sides of the kinetic panels 431a protrude outwardly from the pillar body 100 in the order from the kinetic lighting member 431 positioned at the lower side to the kinetic lighting member 431 positioned at the upper side.

Thereafter, the control unit 800 may sequentially operate the plurality of kinetic actuators 431b so that the other sides of the kinetic panels 431a are inserted back into the pillar body 100 in the order from the kinetic lighting member 431 positioned at the lower side to the kinetic lighting member 431 positioned at the upper side.

At the same time, the control unit 800 may maintain the turned-on state of the plurality of kinetic lamps 431c.

However, the operations of the plurality of kinetic panels 431a and the operations of the kinetic lamps 431c are not limited thereto, and the plurality of kinetic panels 431a and the kinetic lamps 431c may be rotated and turned on in a preset order or randomly.

FIGS. 18 to 21 are views schematically illustrating an operation of creating the line lighting pattern by the line lighting unit according to the first embodiment of the present disclosure.

Figure 18:
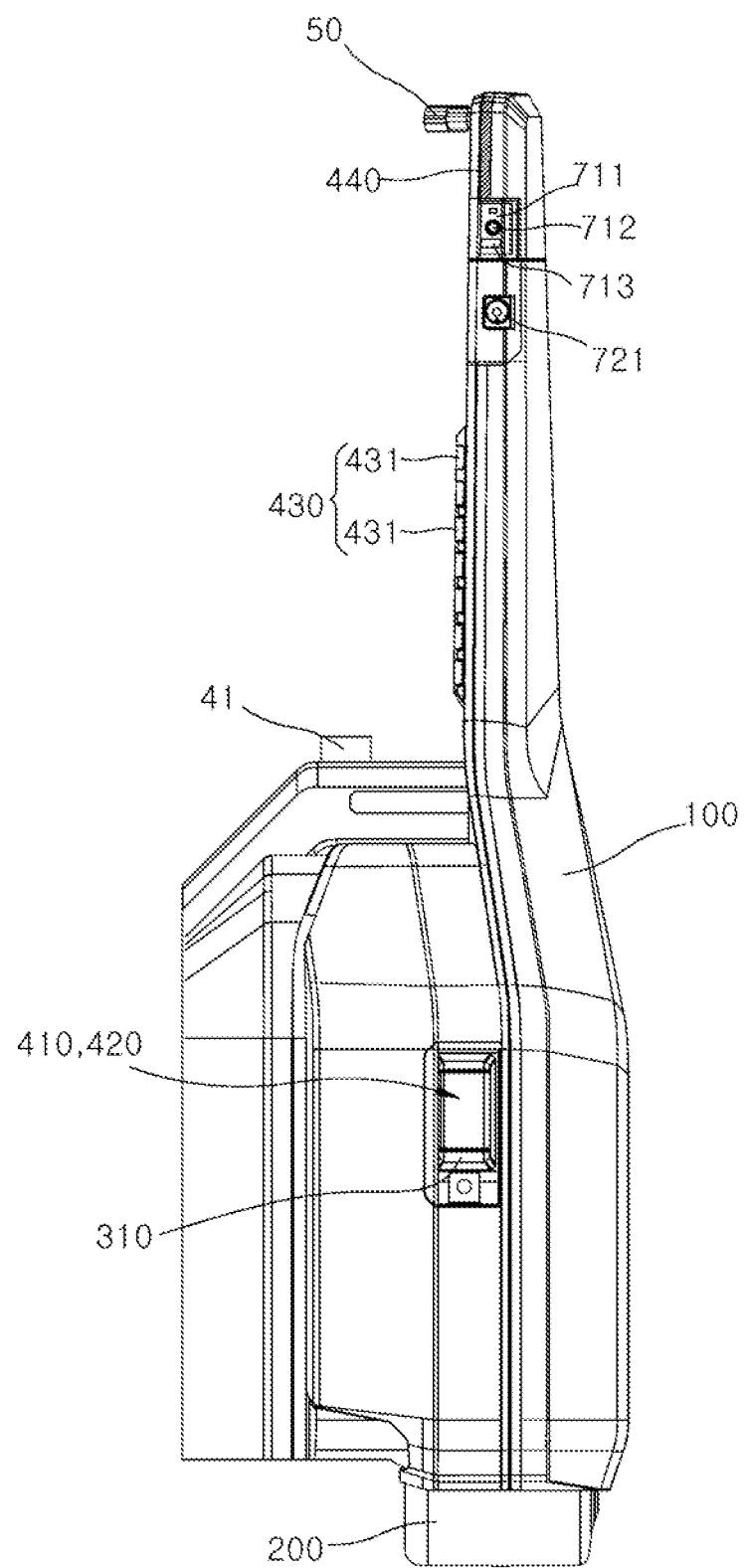
FIGS. 18 to 21 are views schematically illustrating an operation of creating a line lighting pattern by a line lighting unit according to the first embodiment of the present disclosure.

Referring to FIG. 18, in case that the control unit 800 determines that the detection unit 700 is detecting an object positioned at the periphery of the pillar body 100, the control unit 800 may turn on the line lamps 441 positioned in an upper section of the line lighting unit 440 among the plurality of line lamps 441. In this case, for example, the upper section of the line lighting unit 440 may be a section positioned above the first detection member 710 among all the sections of the line lighting unit 440.

Therefore, the line lighting unit 440 may display the situation, in which the detection unit 700 currently recognizes the pedestrian or the like positioned outside the pillar body 100, to the outside of the pillar body 100, thereby providing psychological stability to the pedestrian or the like.

Figure 19:
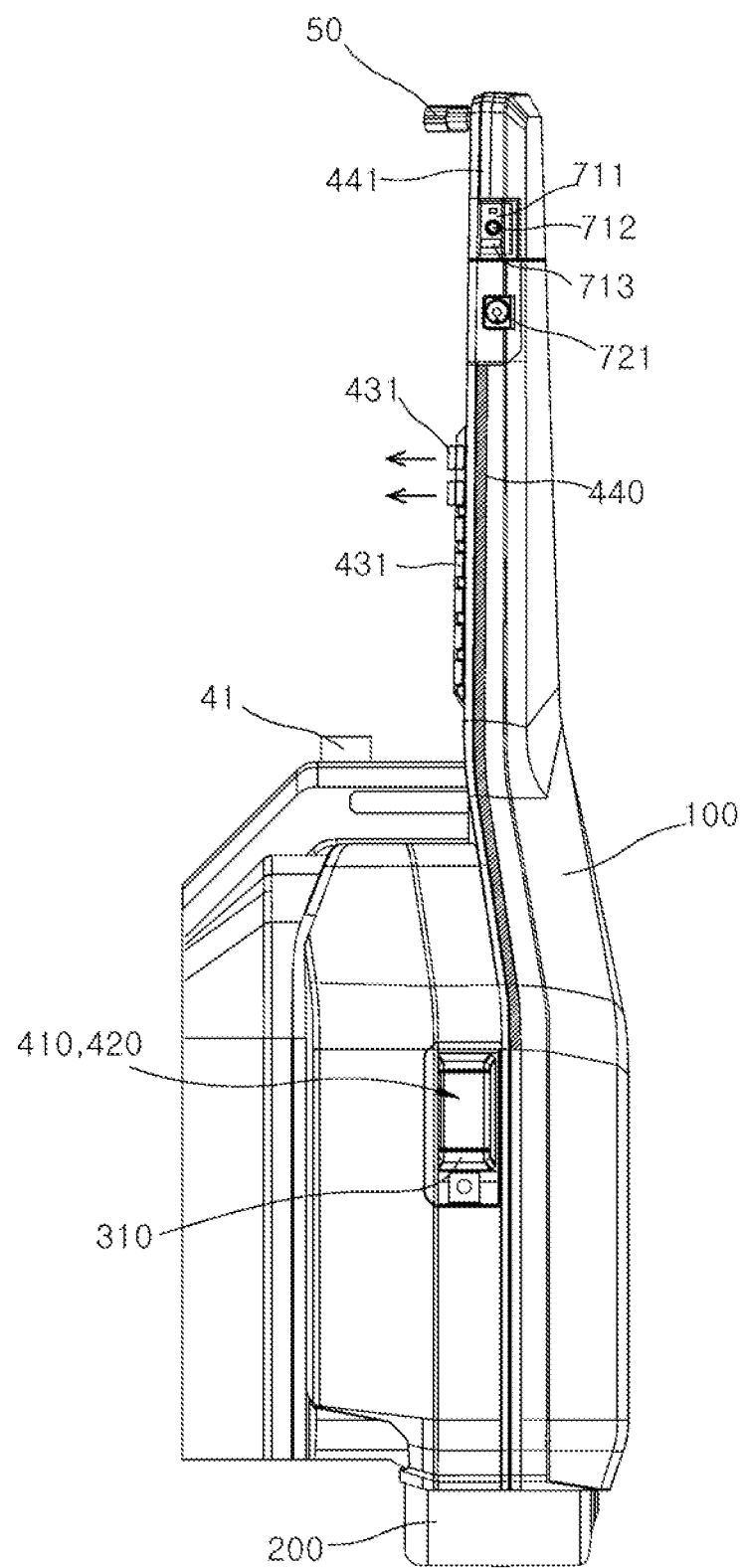

Referring to FIG. 19, in case that the control unit 800 determines that the first lighting unit 410 or the second lighting unit 420 is operating, the control unit 800 may turn on the line lamps 441 positioned in a lower section of the line lighting unit 440 among the plurality of line lamps 441. In this case, the lower section of the line lighting unit 440 may be variously changed in design within a section range positioned below the kinetic lighting unit 430 among all the sections of the line lighting unit 440.

Figure 20:
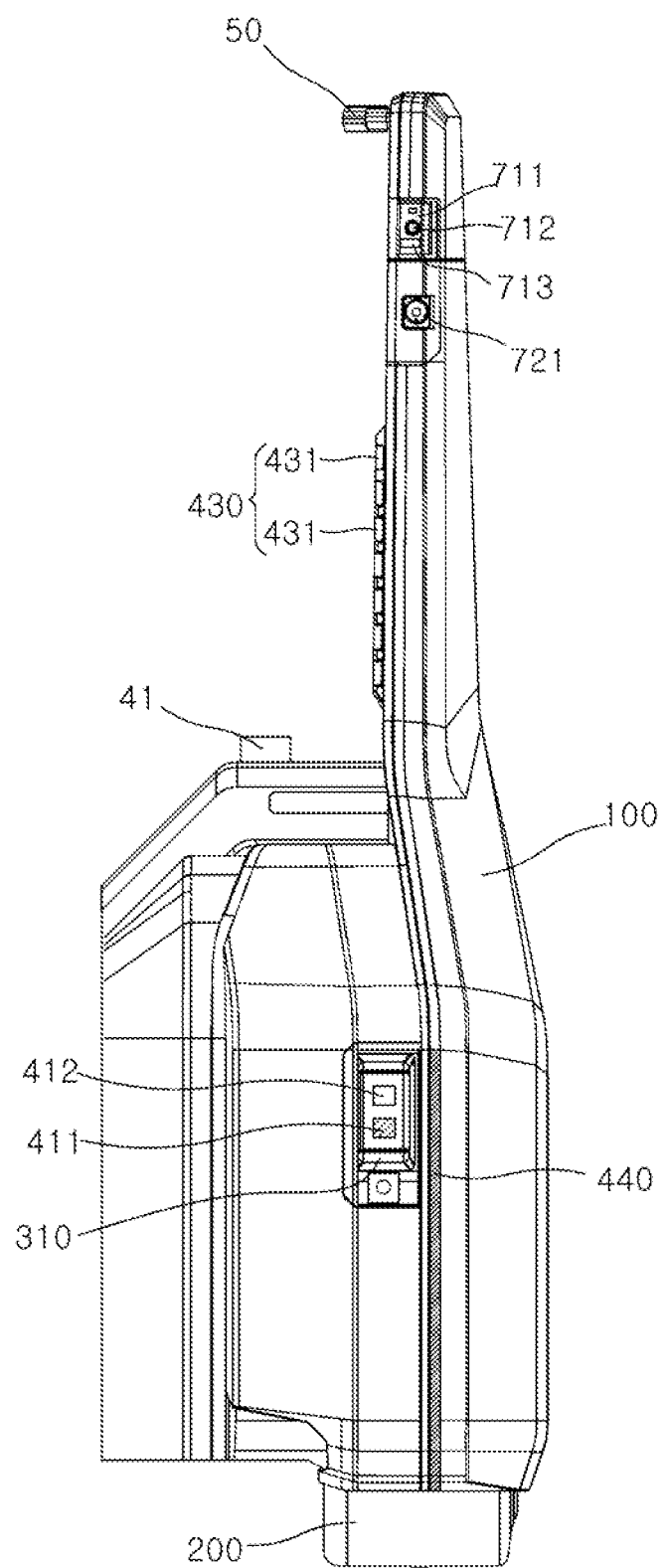

Referring to FIG. 20, in case that the control unit 800 determines that the kinetic lighting unit 430 is operating, the control unit 800 may turn on the line lamps 441 positioned in a central section of the line lighting unit 440 among the plurality of line lamps 441. In this case, for example, the central section of the line lighting unit 440 may be a section between the upper section and the lower section of the line lighting unit 440.

Figure 21:
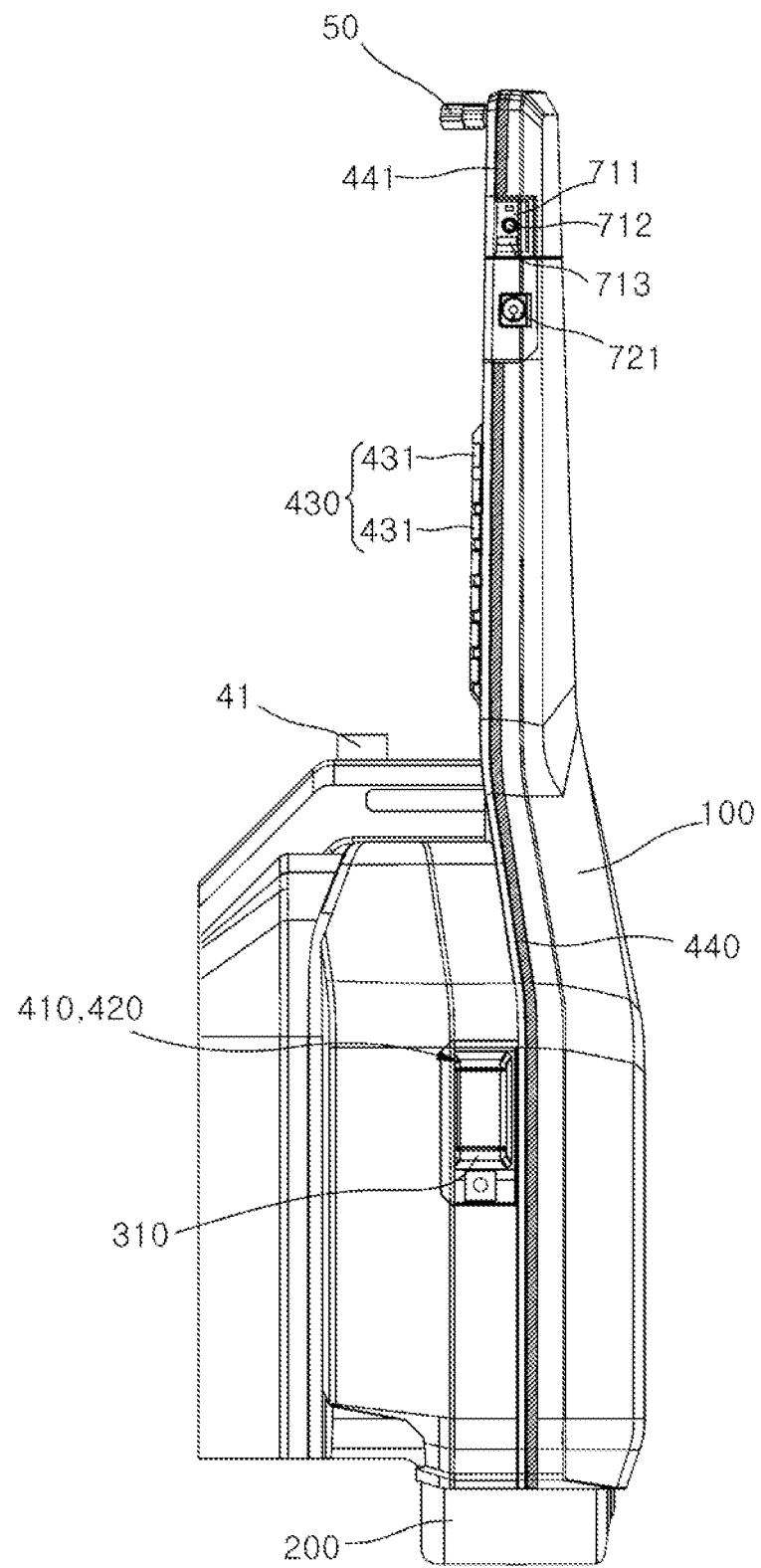

Referring to FIG. 21, in case that the control unit 800 determines that the vehicle is traveling, the control unit 800 may turn on all the plurality of line lamps 441. In this case, the line lighting unit 440 may serve as a daytime running light (DRL).

In addition, in case that the control unit 800 determines that the vehicle is turning or is to turn, the control unit 800 may repeatedly turn on and off the plurality of line lamps 441 at preset time intervals. In this case, the line lighting unit 440 may serve as a turn signal light.

The main cabin 30 is disposed above the platform 10 and has an internal space in which a passenger is seated. The main cabin 30 according to the present embodiment may be provided in the form of a box opened at a lower side thereof and having an empty interior. Various items and devices such as a seat, an operation panel, a table, and the like, which conform to the purpose of the occupant, may be installed in the main cabin 30. In a state in which the open lower side of the main cabin 30 is disposed to be directed toward the upper surface of the platform 10, the main cabin 30 may move downward toward the platform 10, such that the main cabin 30 may be seated on the platform 10. In case that the main cabin 30 is seated on the platform 10, an upper end of the main cabin 30 may be positioned at a lower height than an upper end of the pillar body 100. In case that the main cabin 30 is seated on the platform 10, an outer surface of the main cabin 30 may be spaced apart from the inner surface of the pillar body 100 at a predetermined interval. Therefore, the main cabin 30 may ensure an operating space for the kinetic lighting unit 430. In the state in which the main cabin 30 is seated on the upper surface of the platform 10, the main cabin 30 may move upward from the platform 10, such that the main cabin 30 may be separated from the platform 10. Therefore, the main cabin 30 may be freely replaced. The cross-sectional area and the shape of the main cabin 30 are not limited to the shapes illustrated in FIGS. 1 and 2, but may be variously changed in design depending on the shape of the platform 10 or the like.

The docking unit 40 is provided between the pillar module 20 and the main cabin 30 and fastens the pillar module 20 and the main cabin 30 while operating in conjunction with the upward movement of the main cabin 30.

Figure 22:
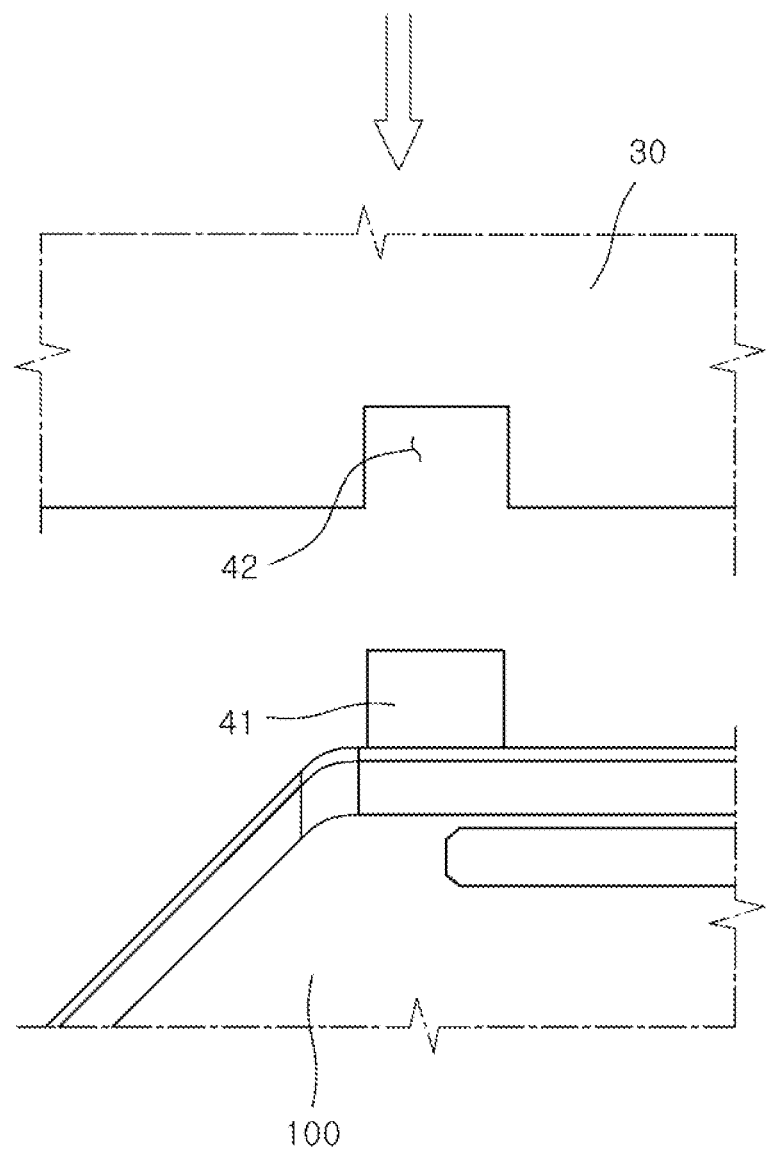
FIG. 22 is an enlarged view schematically illustrating a configuration of a docking unit according to the present embodiment.

FIG. 22 is an enlarged view schematically illustrating a configuration of the docking unit according to the present embodiment.

Referring to FIGS. 1, 2, and 22, the docking unit 40 according to the present embodiment includes a first docking member 41 and a second docking member 42.

The first docking member 41 is provided on the pillar body 100 and defines an external appearance of a side of the docking unit 40. The first docking member 41 according to the present embodiment may formed to have a cylindrical shape extending from a side of the pillar body 100. The first docking member 41 may be disposed so that a longitudinal direction thereof is parallel to a direction in which the main cabin 30 is seated on the platform 10. That is, as illustrated in FIG. 22, the first docking member 41 may be disposed so that the longitudinal direction thereof is perpendicular to the ground surface. The arrangement position of the first docking member 41 is not limited to that illustrated in FIG. 2, but may be variously changed in design to a position at which the first docking member 41 may perpendicularly face the main cabin 30 in the upward/downward direction during the process in which the main cabin 30 is seated on the platform 10. The first docking member 41 may be provided as a plurality of first docking members 41. The plurality of first docking members 41 may be independently installed for each of the pillar bodies 100 provided on the pillar modules 20.

The second docking member 42 is provided on the main cabin 30 and defines an external appearance of the other side of the docking unit 40. As the main cabin 30 is seated on the platform 10, the first docking member 41 may be inserted within the second docking member 42 and fasten the pillar module 20 and the main cabin 30. The second docking member 42 according to the present embodiment may be provided in the form of a groove concavely recessed upward from a lower surface of the main cabin 30. The second docking member 42 may be disposed so that a longitudinal direction thereof is parallel to the direction in which the main cabin 30 is seated on the platform 10. That is, as illustrated in FIG. 22, the second docking member 42 may be disposed so that the longitudinal direction thereof is perpendicular to the ground surface. In case that the main cabin 30 is seated on the platform 10, the second docking member 42 may be disposed at a position at which a central axis of the second docking member 42 is positioned coaxially with a central axis of the first docking member 41. The second docking member 42 may be provided as a plurality of second docking members 42. The plurality of second docking members 42 may correspond in number to the first docking members 41.

The example has been described above in which the first docking member 41 is inserted within the second docking member 42. However, the first docking member 41 and the second docking member 42 are not limited thereto, and the second docking member 42 may be inserted within the first docking member 41. In this case, the first docking member 41 may be provided in the form of a groove concavely recessed toward the inside of the pillar body 100, and the second docking member 42 may be provided in the form of a protrusion protruding from the main cabin 30.

The stopper 50 is installed on the pillar body 100 and prevents the main cabin 30 from separating from the platform 10. That is, after the main cabin 30 is seated on the platform 10 and the first docking member 41 and the second docking member 42 are fastened to each other, the stopper 50 serves to restrict an upward movement of the main cabin 30 toward an upper side of the platform 10. The stopper 50 may be provided as a plurality of stoppers 50. The plurality of stoppers 50 may be independently installed for each of the pillar bodies 100 provided on the pillar modules 20.

Figure 23:
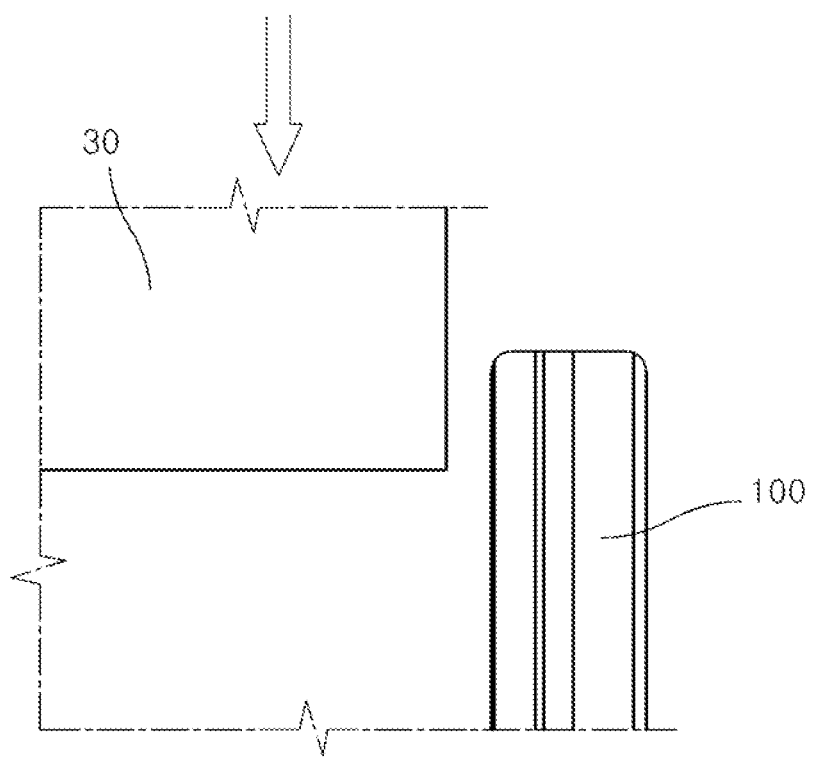
FIGS. 23 and 24 are views schematically illustrating a configuration and an operating state of a stopper according to the first embodiment of the present disclosure.
Figure 24:
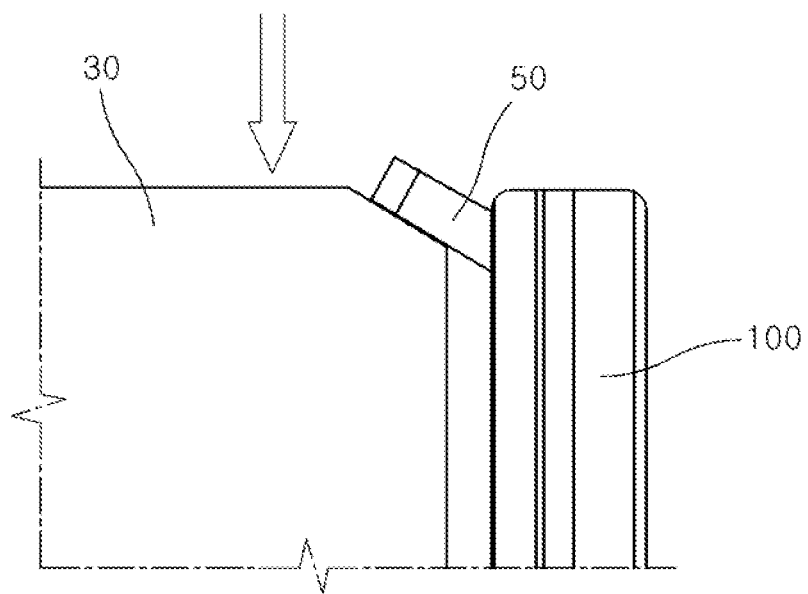

FIGS. 23 and 24 are views schematically illustrating a configuration and an operating state of the stopper according to the first embodiment of the present disclosure.

Referring to FIGS. 23 and 24, the stopper 50 according to the present embodiment may be provided in the form of a rod extending from the upper end of the pillar body 100 toward the main cabin 30. The stopper 50 may be detachably coupled to the pillar body 100. Therefore, the stopper 50 may not interfere with the main cabin 30 during the process in which the main cabin 30 is seated on the platform 10. The stopper 50 may be disposed to intersect the direction in which the first docking member 41 and the second docking member 42 are inserted, i.e., the direction in which the main cabin 30 is seated on the platform 10. For example, as illustrated in FIG. 24, the stopper 50 may be disposed to be inclined at a predetermined angle toward the main cabin 30 with respect to the direction perpendicular to the ground surface. As the main cabin 30 is completely seated on the platform 10, the stopper 50 may be coupled to the pillar body 100, and a lower surface of the stopper 50 comes into contact with the upper surface of the main cabin 30, which makes it possible to prevent the separation of the main cabin 30.

The door unit 60 opens or closes the internal space of the main cabin 30 so that the passenger may get in the main cabin 30.

Figure 25:
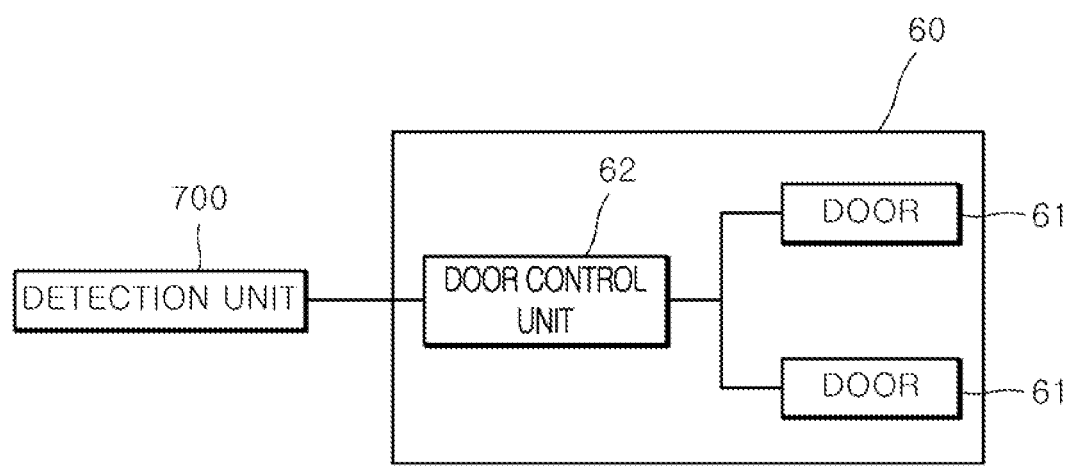
FIG. 25 is a block diagram schematically illustrating a configuration of a door unit according to the first embodiment of the present disclosure.

FIG. 25 is a block diagram schematically illustrating a configuration of the door unit according to the first embodiment of the present disclosure.

Referring to FIGS. 2 and 25, the door unit 60 according to the present embodiment includes a door 61 and a door control unit 62.

The door 61 is movably connected to the main cabin 30 and opens or closes the internal space of the main cabin 30 depending on a movement direction. Examples of the door 61 according to the present embodiment may include various types of opening/closing means that may open or close the internal space of the main cabin 30 in a hinged or sliding manner. The door 61 may be provided as a plurality of doors 61. The plurality of doors 61 may be spaced apart from one another along the peripheral surface of the main cabin 30.

FIG. 2 illustrates an example in which two doors 61 are provided, but the number of doors 61 and the arrangement state of the door 61 are not limited thereto. The number of doors 61 and the arrangement state of the door 61 may be variously changed in design.

The door control unit 62 individually controls the operation of opening or closing the plurality of doors 61 on the basis of data detected from the detection unit 700. The door control unit 62 may include at least any one of an electronic control unit (ECU), a central processing unit (CPU), a processor, and a system on chip (SoC). The door control unit 62 may control a plurality of hardware or software constituent elements by operating an operating system or an application and perform various types of data processing and computation. The door control unit 62 may be configured to execute at least one instruction stored in a memory and store data, related to the result of executing the instruction, in the memory. The door control unit 62 may include at least any one of a radio frequency (RF) device, a wireless fidelity (Wi-Fi) device, a Bluetooth device, a Zigbee device, and a near field communication (NFC) device that may implement various types of communication protocols that may receive the data detected by the detection unit 700.

Figure 26:
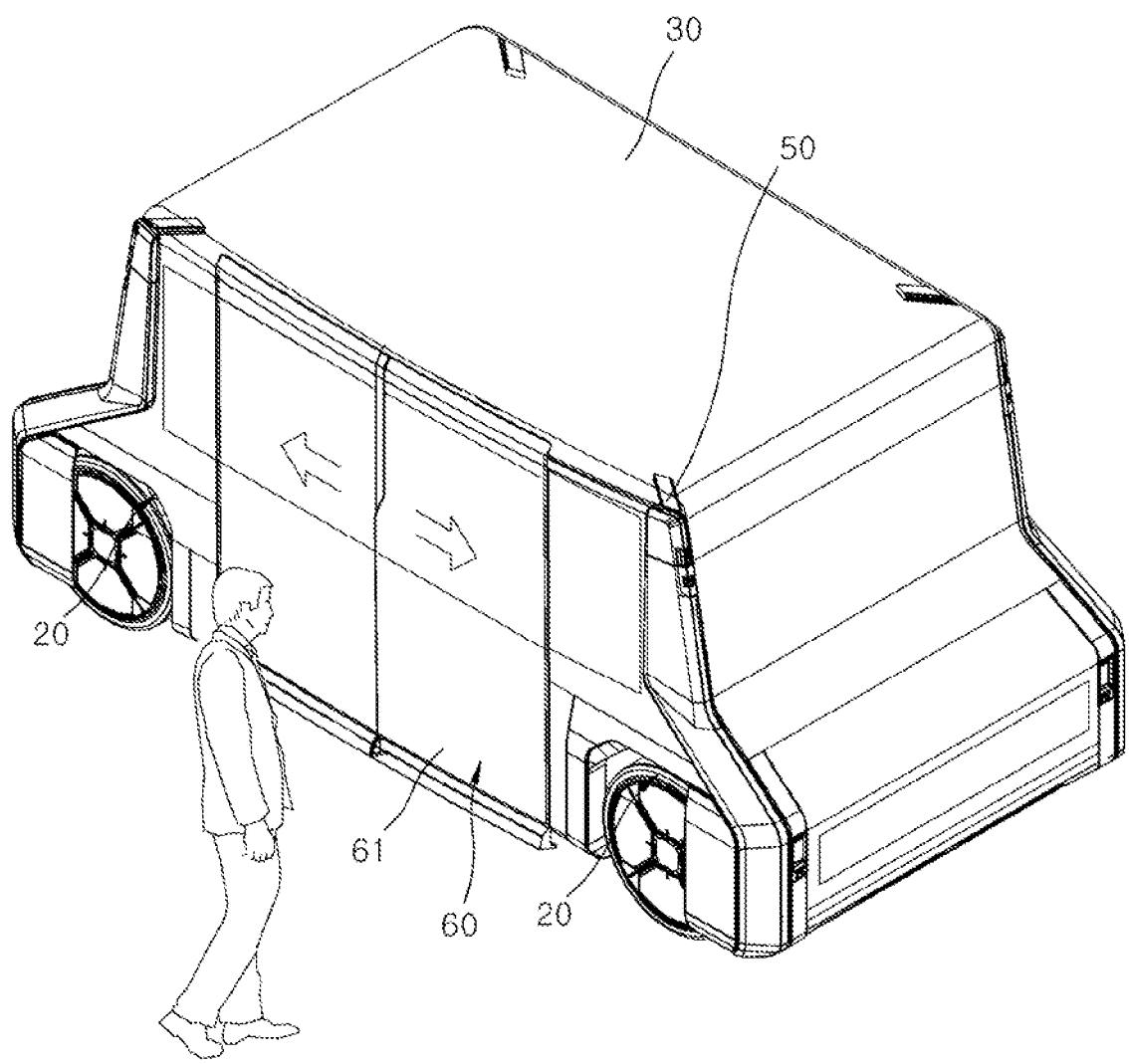
FIG. 26 is a view schematically illustrating an operating state of the door unit according to the first embodiment of the present disclosure.

FIG. 26 is a view schematically illustrating an operating state of the door unit according to the first embodiment of the present disclosure.

Referring to FIG. 26, as a driver, a passenger, or the like approaches the periphery of the vehicle, the detection unit 700 detects a position of the driver, the passenger, or the like.

The door control unit 62 calculates a distance from the door 61 and the detection unit 700 to the detected driver or passenger on the basis of information on the position of the driver or passenger detected by the detection unit 700 and previously inputted information on the positions of the plurality of doors 61.

The door control unit 62 determines the door 61 positioned to be closest to the driver or passenger, among the plurality of doors 61, on the basis of the calculated distance information, and opens the corresponding door 61.

Figure 27:
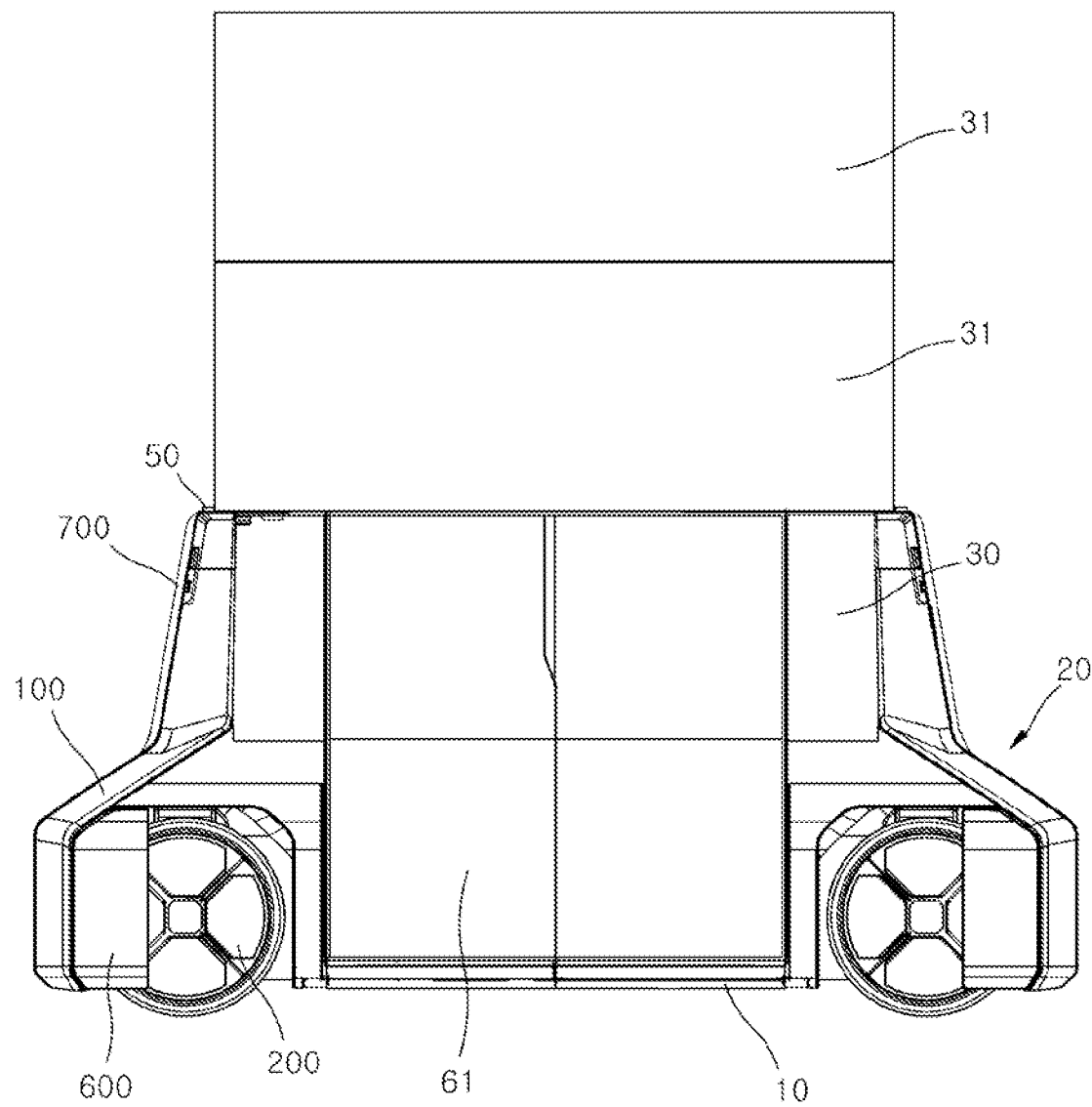
FIG. 27 is a front view schematically illustrating a configuration of a vehicle having a pillar module according to a second embodiment of the present disclosure.

FIG. 27 is a front view schematically illustrating a configuration of a vehicle having a pillar module according to a second embodiment of the present disclosure.

The vehicle having the pillar module according to the second embodiment of the present disclosure differs from the vehicle having the pillar module according to the first embodiment of the present disclosure only in that the vehicle having the pillar module according to the second embodiment of the present disclosure further includes a transport cabin 31. Therefore, in the description of the configuration of the vehicle having the pillar module according to the second embodiment of the present disclosure, only the transport cabin 31, which is the difference between the vehicle having the pillar module according to the second embodiment of the present disclosure and the vehicle having the pillar module according to the first embodiment of the present disclosure, will be described. The corresponding description of the vehicle having the pillar module according to the first embodiment of the present disclosure applies without change to the description of the remaining components of the vehicle having the pillar module according to the second embodiment of the present disclosure.

Referring to FIG. 27, the vehicle having the pillar module according to the present embodiment may further include the transport cabin 31.

The transport cabin 31 is stacked on the main cabin 30 and detachably coupled to the main cabin 30. The transport cabin 31 serves to expand a luggage loading space of the vehicle separately from the main cabin 30.

The transport cabin 31 according to the present embodiment may be provided in the form of a box opened at a lower side thereof and having an empty interior. A cross-sectional area of the transport cabin 31 may be smaller than a cross-sectional area of the main cabin 30. Therefore, in case that the transport cabin 31 is stacked on the main cabin 30, the interference with the stopper 50 may be prevented. The transport cabin 31 may be detachably coupled to the main cabin 30 by bolting, docking, or the like.

The transport cabin 31 may be provided as a plurality of transport cabins 31. The plurality of transport cabins 31 may be sequentially stacked on the main cabin 30. In this case, the transport cabin 31, which is disposed at a lowermost end among the plurality of transport cabins 31, may be detachably coupled to the main cabin 30. The adjacent transport cabins 31 may be detachably coupled to each other by bolting, docking, or the like. Therefore, the number of stacked transport cabins 31 may be freely adjusted depending on a capacity for luggage to be loaded.

While the present disclosure has been described with reference to the embodiments depicted in the drawings, the embodiments are for illustrative purposes only, and those skilled in the art to which the present technology pertains will understand that various modifications of the embodiments and any other embodiments equivalent thereto are available.

Accordingly, the technical protection scope of the present disclosure should be determined by the appended claims.

What is claimed is:

1. A pillar module comprising:
a pillar body;
a drive unit connected to the pillar body and configured to support the pillar body so that the pillar body is movable;
a first lighting unit disposed on the pillar body and configured to generate a first lighting pattern;
a second lighting unit spaced apart from the first lighting unit and configured to generate a second lighting pattern; and
a switching unit connected to the first and second lighting units and configured to move the first and second lighting units such that only one of the first and second lighting units is exposed externally of the pillar body at a time.

2. A pillar module comprising:
a pillar body;
a drive unit connected to the pillar body and configured to support the pillar body so that the pillar body is movable;
a first lighting unit disposed on the pillar body and configured to generate a first lighting pattern;
a second lighting unit spaced apart from the first lighting unit and configured to generate a second lighting pattern; and
a switching unit connected to the first and second lighting units and configured to selectively expose the first and second lighting units externally of the pillar body,
wherein the pillar body includes an accommodation portion having an opening side, and
wherein the first and second lighting units are disposed at the accommodation portion of the pillar body and configured to selectively face the opening side of the accommodation portion of the pillar body when exposed externally of the pillar body by the switching unit.

3. The pillar module of claim 2, wherein the switching unit comprises:
   a switching case rotatably disposed at the accommodation portion and configured to support the first and second lighting units; and
   a switching actuator connected to the switching case and configured to generate a rotational force to rotate the switching case.

4. The pillar module of claim 3, wherein a central axis of the switching case is in parallel with the opening side of the accommodation portion.

5. The pillar module of claim 3, wherein the first and second lighting units are spaced apart from each other along a peripheral surface of the switching case.

6. The pillar module of claim 3, wherein the first lighting unit comprises a road surface illumination lamp facing the opening side of the accommodation portion and configured to rotate together with the switching case and emit an optical image toward a road surface.

7. The pillar module of claim 3, wherein the second lighting unit comprises a plurality of pixel lamps configured to rotate together with the switching case and be independently turned on or off.

8. The pillar module of claim 7, wherein the plurality of pixel lamps is arranged in a lattice on a peripheral surface of the switching case.

9. A pillar module comprising:
   a pillar body;
   a drive unit connected to the pillar body and configured to support the pillar body so that the pillar body is movable;
   a first lighting unit disposed on the pillar body and configured to generate a first lighting pattern;
   a second lighting unit spaced apart from the first lighting unit and configured to generate a second lighting pattern;
   a switching unit connected to the first and second lighting units and configured to selectively expose the first and second lighting units externally of the pillar body; and
   a kinetic lighting unit movably disposed on the pillar body and configured to create a kinetic lighting pattern.

10. The pillar module of claim 9, wherein the kinetic lighting unit is disposed above the first and second lighting units.

11. The pillar module of claim 9, wherein the kinetic lighting unit comprises a plurality of kinetic lighting members spaced apart from one another and independently movable on the pillar body.

12. The pillar module of claim 11, wherein the kinetic lighting member comprises:
   a kinetic panel including a first side rotatably coupled to the pillar body and a second side protruding outwardly from the pillar body or inserted within the pillar body depending on a rotation direction of the kinetic panel;
   a kinetic actuator connected to the first side of the kinetic panel and configured to generate a rotational force to rotate the kinetic panel; and
   a kinetic lamp configured to be exposed externally of the pillar body when the second side of the kinetic panel protrudes outwardly from the pillar body.

13. The pillar module of claim 12, wherein the kinetic lamp is disposed at an end of the second side of the kinetic panel.

14. The pillar module of claim 1, further comprising a line lighting unit extending in a vertical direction along an outer surface of the pillar module.

15. The pillar module of claim 14, wherein the line lighting unit comprises a plurality of line lamps spaced apart from each other in an extension direction of the line lighting unit and configured to be independently turned on or off.

16. The pillar module of claim 1, further comprising:
   a detection unit disposed on the pillar body and configured to detect an object positioned at a periphery of the pillar body; and
   a control unit configured to control the first and second lighting units and the switching unit.

17. The pillar module of claim 16, wherein the detection unit is disposed at an upper side of the pillar body.

18. The pillar module of claim 16, wherein the detection unit comprises a first detection member rotatably disposed on the pillar body and configured to rotate in conjunction with a change to a relative position of the object with respect to the pillar body.

19. The pillar module of claim 1, further comprising a speaker unit disposed at the pillar body and configured to output a sound.

20. The pillar module of claim 1, further comprising a flap movably coupled to the pillar body, facing the drive unit, and configured to move in conjunction with a steering operation of the drive unit.

\* \* \* \* \*